Aug. 20, 1963
G. W. YOUNKIN
3,101,436
NUMERICALLY CONTROLLED POSITIONING SYSTEM
Filed April 28, 1960
14 Sheets-Sheet 1
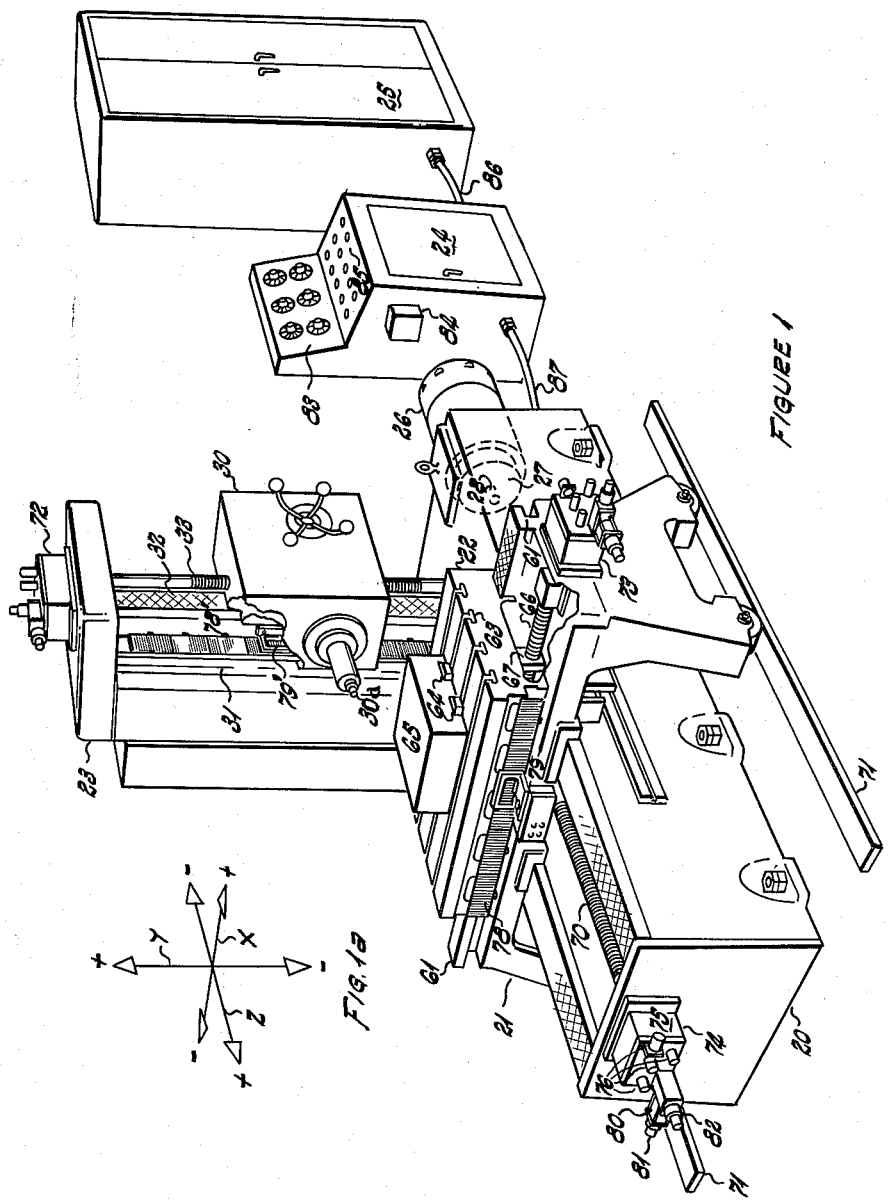
INVENTOR.
GEORGE W. YOUNKIN
BY
ATTORNEYS

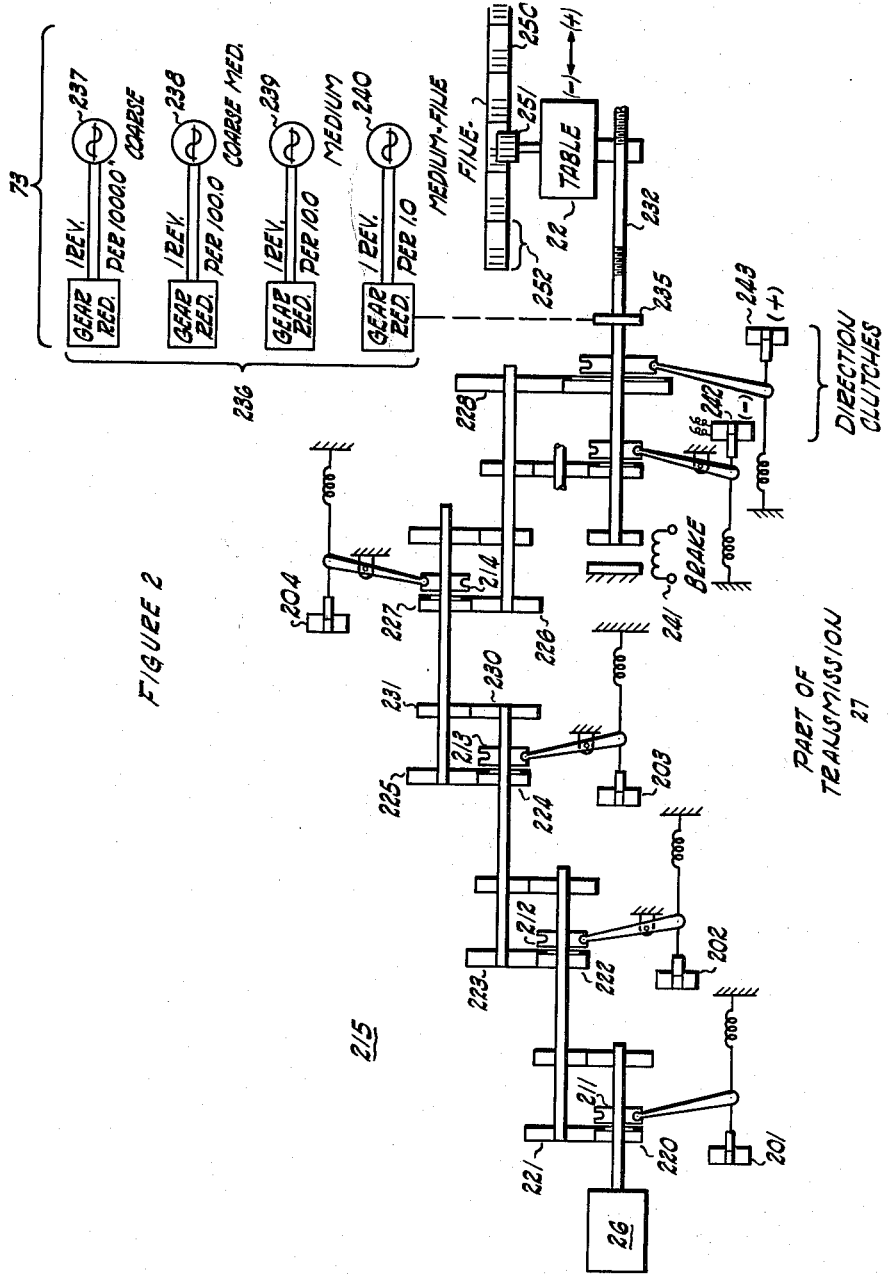

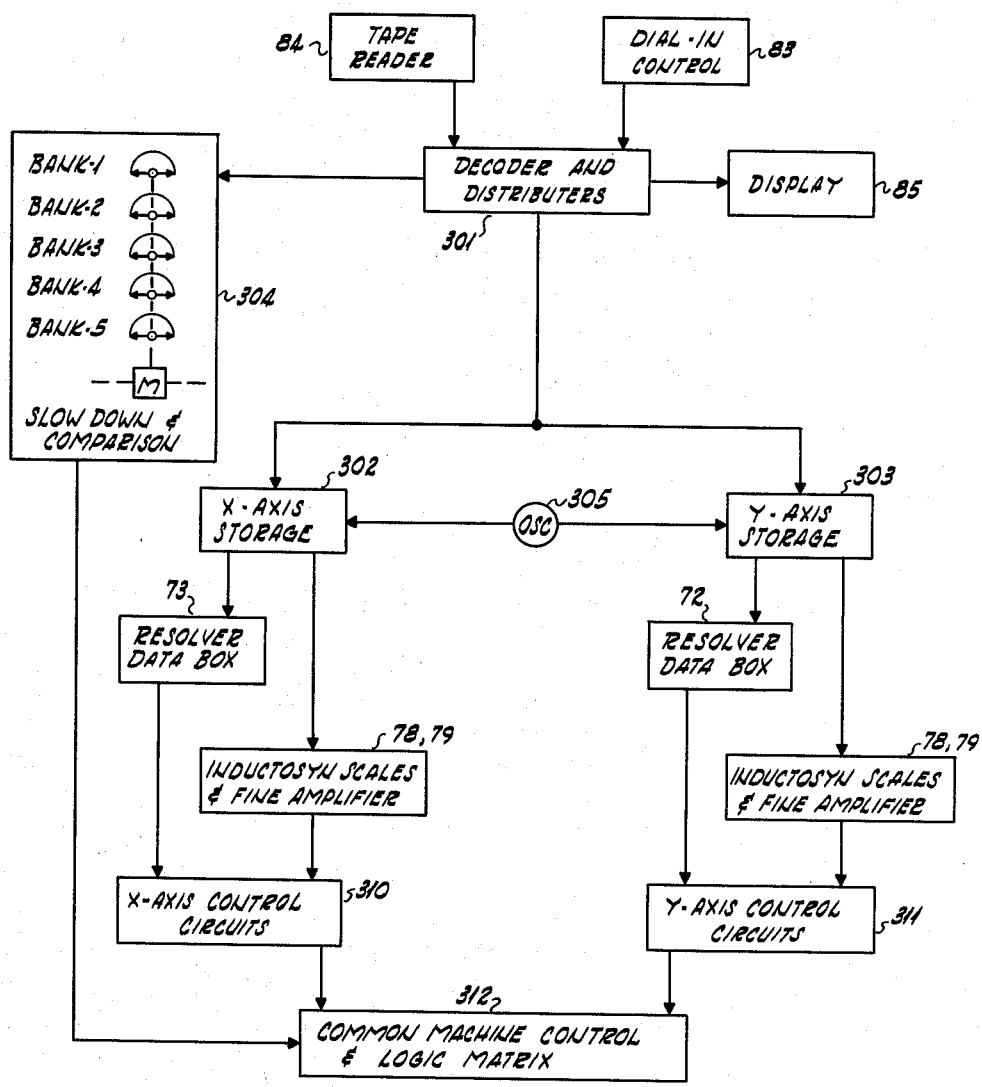
FIGURE 3   2 AXIS BLOCK DIAGRAM

Aug. 20, 1963          G. W. YOUNKIN                3,101,436
              NUMERICALLY CONTROLLED POSITIONING SYSTEM
Filed April 28, 1960                              14 Sheets-Sheet 4

SYMBOLS

  — RELAY WINDING

— REFERENCE SYMBOL IDENTIFYING RELAY

 — NORMALLY OPEN CONTACTS

 — NORMALLY CLOSED CONTACTS

—|(— — CAPACITOR

— IDENTIFIES RELAY
— IDENTIFIES CONTACT ON RELAY
— IDENTIFIES AXIS WITH WHICH RELAY CONTACTS ARE ASSOCIATED

 — RESOLVER OR SYNCHROMOTOR

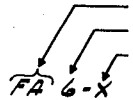 — CLUTCH WINDINGS OR SOLENOID

C    — COARSE
CM   — COARSE-MEDIUM
M    — MEDIUM
MF   — MEDIUM-FINE
FA   — FINE A
FB   — FINE B OR CREEPING
X    — X-AXIS
Y    — Y-AXIS
(+)  — FIRST DIRECTION OF MACHINE MOTION
(−)  — REVERSE DIRECTION OF MACHINE MOTION

FIGURE 4

INVENTOR.
                           GEORGE W. YOUNKIN
                       BY
                              ATTORNEYS

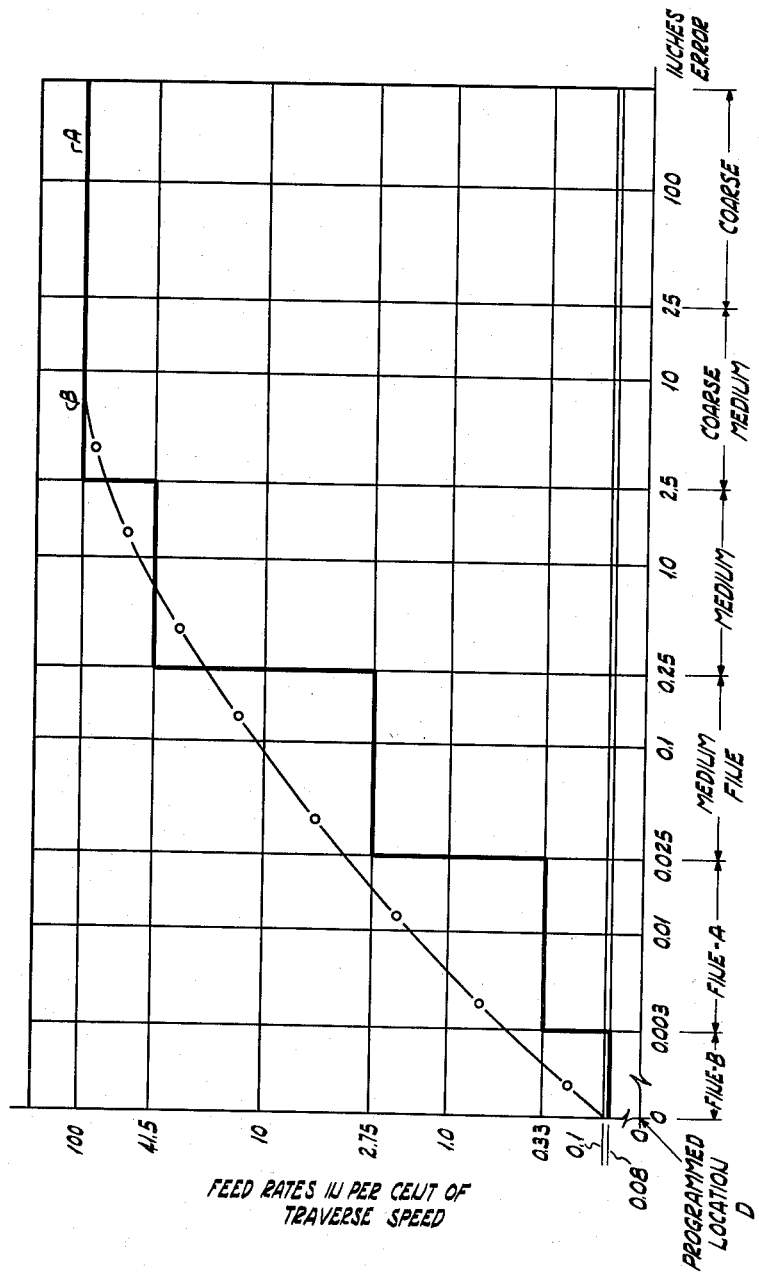

| FEED № | H₁ | H₂ | H₃ | H₄ | H₅ | H₆ | H₇ | FEED RATE IN/MIN | |
|---|---|---|---|---|---|---|---|---|---|
| 1 | X | X | X | | | | X | 120 | COARSE AND COARSE MEDIUM |
| 2 | X | | X | | | | X | 85 | |
| 3 | | X | X | | | | X | 65 | |
| 4 | | | X | | | | X | 50 | |
| 5 | X | X | | X | | | X | 35 | MEDIUM |
| 6 | X | | | X | | | X | 25 | |
| 7 | | X | | X | | | X | 20 | |
| 8 | | | | X | | | X | 15 | |
| 9 | X | X | | | X | | X | 10 | |
| 10 | X | | | | X | | X | 8 | |
| 11 | | X | | | X | | X | 6 | |
| 12 | | | | | X | | X | 4.5 | |
| 13 | X | X | | | | X | X | 3.3 | MEDIUM FINE |
| 14 | X | | | | | X | X | 2.5 | |
| 15 | | X | | | | X | X | 1.8 | |
| 16 | | | | | | X | X | 1.3 | |
| 17 | X | X | X | | | | | 1.00 | |
| 18 | X | | X | | | | | .750 | |
| 19 | | X | X | | | | | .580 | |
| 20 | | | X | | | | | .420 | |
| 21 | X | X | | X | | | | .300 | FINE·A |
| 22 | X | | | X | | | | .230 | |
| 23 | | X | | X | | | | .180 | |
| 24 | | | | X | | | | .130 | |
| 25 | X | X | | | X | | | .100 | FINE·B |
| 26 | X | | | | X | | | .070 | |
| 27 | | X | | | X | | | .050 | |
| 28 | | | | | X | | | .040 | |
| 29 | X | X | | | | X | | .030 | |
| 30 | X | | | | | X | | .020 | |
| 31 | | X | | | | X | | .015 | |
| 32 | | | | | | X | | .012 | |

FIGURE 7   TARGET TABLE

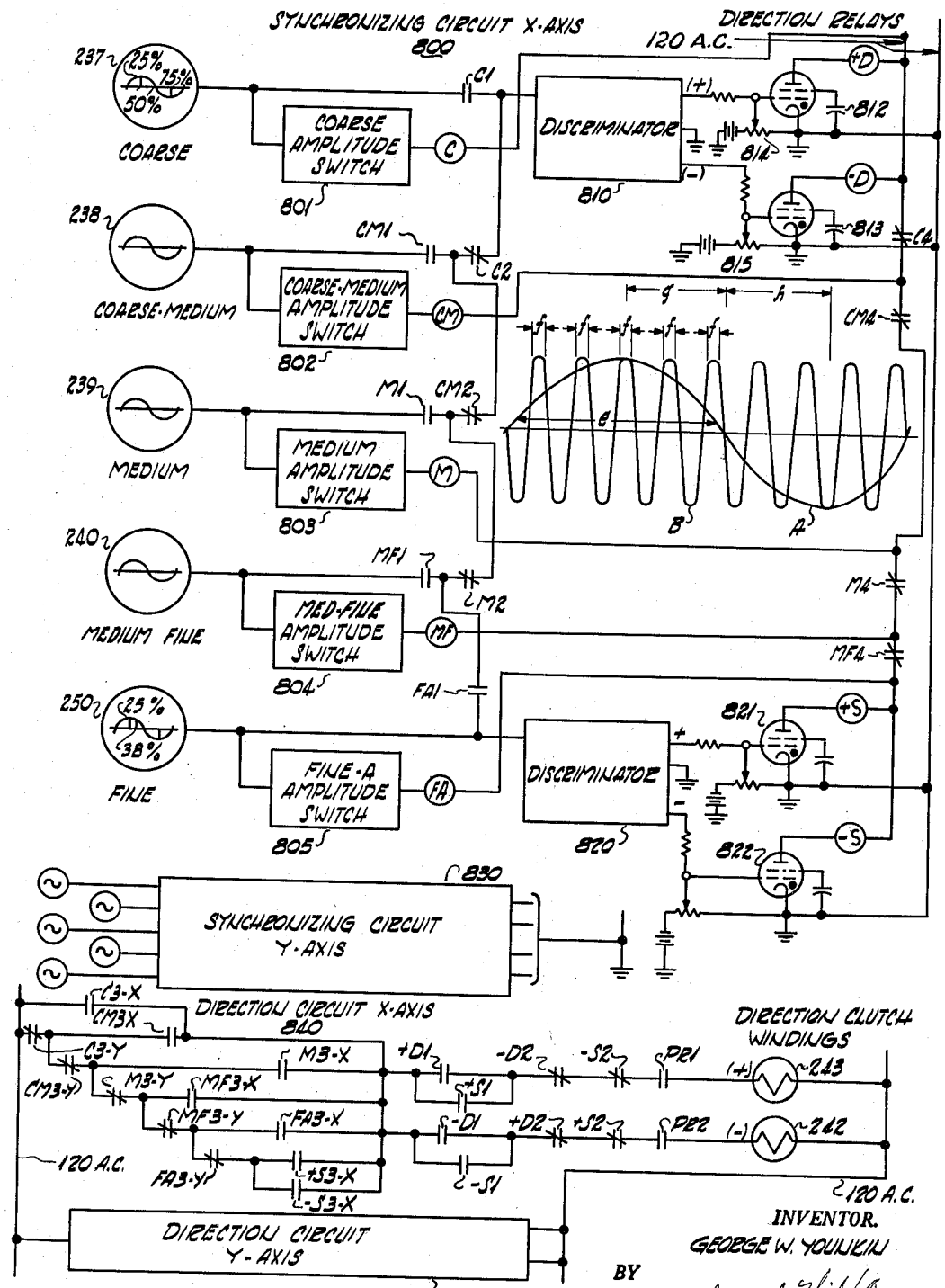

Aug. 20, 1963   G. W. YOUNKIN   3,101,436
NUMERICALLY CONTROLLED POSITIONING SYSTEM
Filed April 28, 1960   14 Sheets-Sheet 13
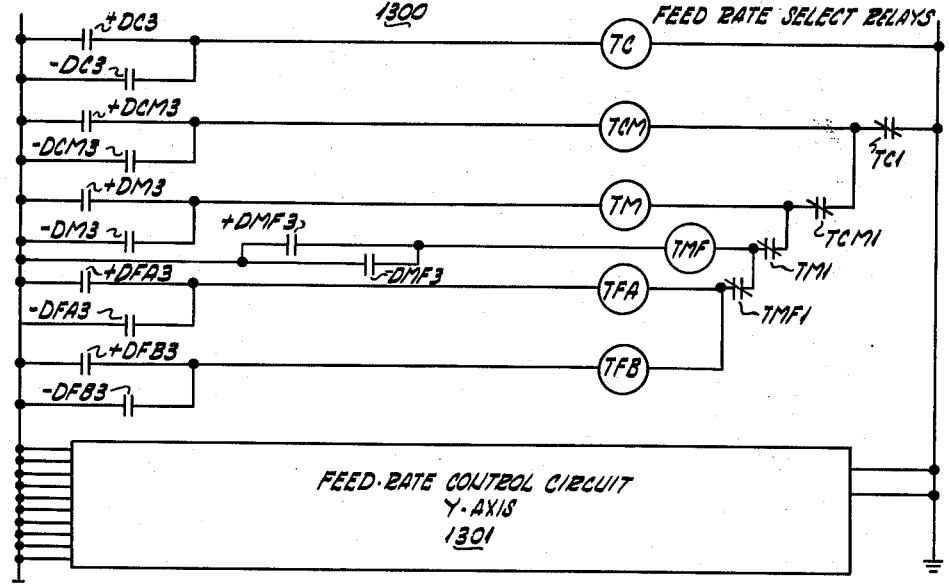
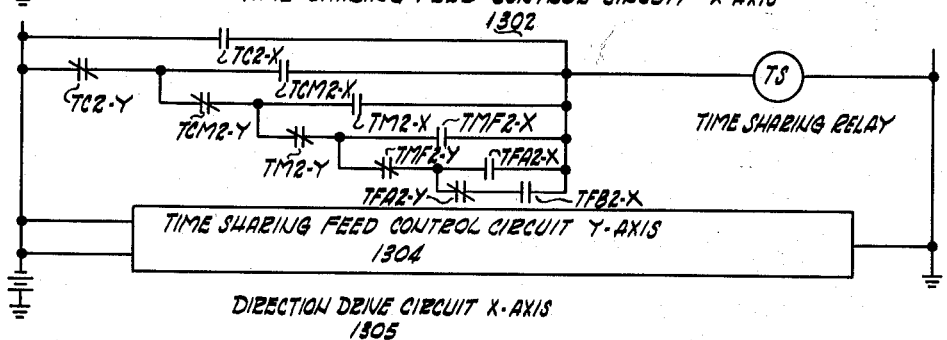
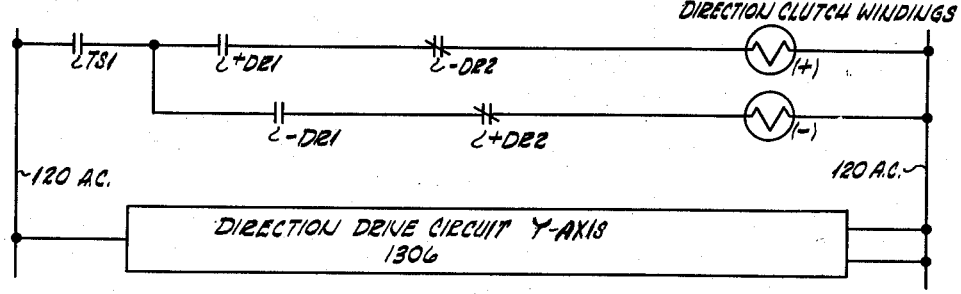
FIGURE 13
INVENTOR.
GEORGE W. YOUNKIN
BY
Wolfe, Hubbard, Voit & Osann
ATTORNEYS

United States Patent Office 3,101,436
Patented Aug. 20, 1963

3,101,436
NUMERICALLY CONTROLLED POSITIONING SYSTEM
George W. Younkin, Fond du Lac, Wis., assignor to Giddings & Lewis Machine Tool Company, Fond du Lac, Wis., a corporation of Wisconsin
Filed Apr. 28, 1960, Ser. No. 25,454
19 Claims. (Cl. 318—162)

This invention relates to numerically controlled positioning systems and more particularly to systems for automatically positioning the members of automatic machine tools within a minimum time period.

In the art of controlling automatic machine tools it has been customary to use numerical command signals which establish a work cycle including the directing of tool members to a programmed location. Typically, these command signals define the location to which the tool members may be moved in terms of distances along two or three axes in much the same manner that points are located on graph paper. For example, a particular location may be indicated as four units along the X-axis and three units along the Y-axis. If the movable members of a machine tool are moved to this indicated location in separate and distinct motions along each of the axes, it requires four units of travel time to move in the X-axis and three units of travel time to move in the Y-axis—a total of seven units of travel time. On the other hand, if the tool members are commanded to move directly to the indicated location, as along the hypotenuse of a triangle defined by the X- and Y-coordinates, there is a savings of time since the travel time has been reduced from seven to five units in the cited example.

It is not enough, however, merely to command the machine tool members to move in such a simple and direct manner, it is also necessary to provide a feedback system which compares the physical position of the members with the programmed location and takes corrective action as the members move. Since feedback systems become quite complex, it has been customary to move the tool members in individual and distinct motions, either along individual axes or to preliminary and then final position, thereby sacrificing the time required to complete such motions.

In adition to the time savings which is afforded when the tool members are moved directly to the programmed location, there are other time savings which may be effected if the members are moved at different feed rates. For example, when tool members are appreciable distances from a programmed location, they may be driven at a relatively high feed rate; however, if they continue to be driven at the same feed rate when they closely approach the programmed location, the inertia of the moving members and the time required to respond to control signals will tend to carry the members too far. Therefore, there may be an additional savings of time if the machine tool members are initially moved at a relatively high feed rate and then at progressively slower feed rates as the members closely approach the programmed locations. However, the feed rate is not an independently variable function; rather, it is a factor which must be integrated into still other functions of the machine tool. For example, in a continuously cutting machine tool, such as a milling tool, for example, it is necessary to maintain a feed rate which is less than a maximum allowable cutting rate considering the nature of a cutting tool and the material that is being cut thereby.

Moreover, when machine tool members are driven along two or more axes simultaneously, as described above, it is necessary to integrate the feed rate with the angle or direction in which the members are driven. More specifically, in the example where the indicated location or direction is four units in an X direction and three in a Y direction, a uniform feed rate which is continuously applied in both directions simultaneously may result in overshooting the programmed Y location before reaching the programmed X location. Quite obviously, other examples could be cited to illustrate the difficulties encountered when electrical command signals and physical mechanical motion are integrated to provide a smooth working machine requiring a minimum of travel time.

Accordingly, it is an object of this invention to provide new and improved automatic machine tools, and more particularly to provide smooth working machines which require a minimum of travel time.

Another object of this invention is to provide for moving the members of automatic machines directly to programmed locations in substantially a single direction which is a composite of directions that are expressed in terms of distances measured along each of a plurality of axes.

Still another object of this invention is to indicate fixed rates which become progressively slower as the members of an automatic machine tool approach an indicated location. In this connection, it is an object of this invention to compare the maximum allowable cutting rate for a cutting tool and a material which is being cut thereby with the indicated feed rate and to select the slower of the two.

A further object of this invention is to materially reduce the travel time required for driving automatic machine tool members to an indicated location while positioning a workpiece relative to a working tool with extreme accuracy. In this connection, an object is to position a workpiece at the maximum feed rate which is commensurate with the allowable cutting speed of an associated tool, while providing for the matching of electrical control signals with mechanical motion in a manner which avoids jitter which might otherwise be caused by changing feed rates.

Other objects and advantages will become apparent as the following description proceeds, taken in conjunction with the accompanying drawings, in which:

FIGURE 1 is a perspective view of an automatic machine tool controlled in accordance with this invention;

FIG. 1a is provided to identify the directions and axes in which the machine tool members may move;

FIG. 2 is a diagrammatic showing of a motor and gear train for driving a machine tool together with gear reduction units and resolvers for detecting the physical location of the machine tool's movable members;

FIG. 3 is a block diagram which is provided to help explain the electrical control system for a machine tool;

FIG. 4 shows symbols and conventions which are used in the electrical circuit drawings which follow;

FIG. 5 is a graph or curve which is helpful in explaining how the feed rate may be changed to slow a machine tool's moving member as it approaches an indicated location;

FIG. 7 is a target table which sets forth the many feed rates that are made available by a selective energization of proper clutch windings such as those shown in FIG. 2;

FIGS. 8–10 are circuit diagrams which disclose a first species of the invention;

FIGS. 12–14 disclose by a circuit diagram a second embodiment of the invention.

Figure 6:
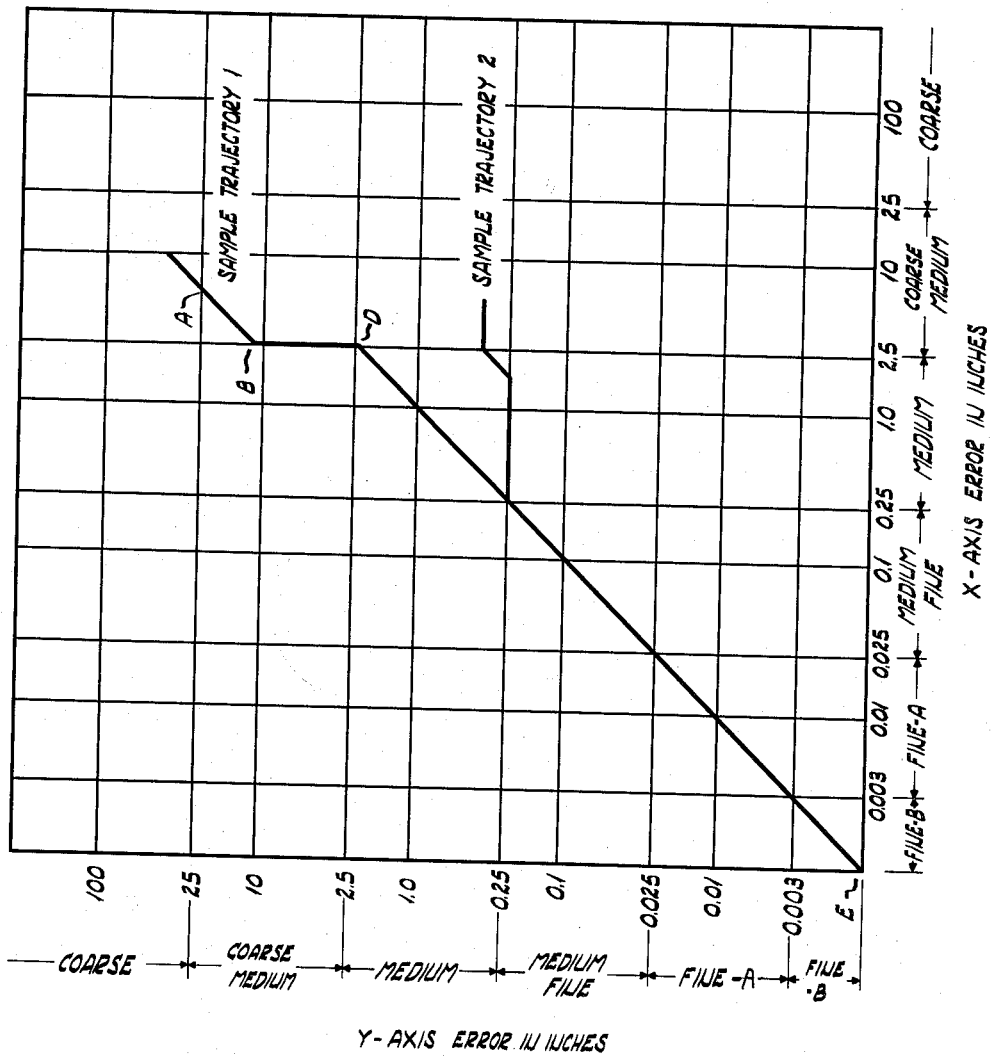
FIG. 6 is a graph which is helpful in explaining how the moving members of a machine tool are driven directly to a programmed location in substantially a single direction which is a composite of a commanded motion measured along X- and Y-axes.

While the invention has been shown and will be described in some detail with reference to particular embodiments thereof, there is no intention that it be limited to such detail. On the contrary, it is intended here to cover all modifications, alternatives, and equivalents falling within the spirit and scope of the invention as defined in the appended claims.

Turning next to FIGURE 1, there is shown an exemplary automatic machine tool which may be controlled in accordance with the subject invention. The major elements of the machine tool are a bed 20, a saddle 21, a table 22, a vertical tool support element 23, console 24 and an associated electrical control system 25. Attached to and supported by bed 20 are a motor 26 and transmission 27, which are coupled through a drive shaft 28 to provide the power required to drive the various elements of the machine tool in each axis of tool motion. It is also within the scope of the invention to provide three separate drives, one for each axis of movement.

A movable member, here shown as headstock 30 and tool 30a, is mounted to ride on vertical ways 31, 32, the power for driving headstock 30 being transmitted from drive shaft 28 through feed screw 33. To support a workpiece for motion in a horizontal direction, a movable member in the form of table 22 is mounted on ways 61, 61 which are part of a saddle 21. Formed in table 22 are a plurality of T-shaped grooves 63 into which any suitable lugs 64 may be fitted and thereafter locked into position. A workpiece 65 may, therefore, be precisely positioned by making proper contact with the lugs 64. The table 22 and, therefore, workpiece 65, may be moved back and forth on the ways 61, 61 responsive to power applied from the motor 26 through transmission 27, drive shaft 28, and feed screw 66 to a nut 67 which is permanently attached to table 22. To provide for motion in a third axis, another movable member, the saddle 21 is mounted to ride upon ways 71, 71. To furnish the power which drives the saddle 21, a feed screw 70 is geared to the motor 26 via the drive shaft 28 and the transmission 27.

For convenience of reference, FIG. 1a has been included to identify the various directions and axes in which the automatic machine tool members may be driven. For example, when the headstock 30 moves upward, it is said to be moving in a (+) Y direction and when it moves downward, it is described as moving in a (—) Y direction. In a similar manner, table 22 may move in either a (+) X or a (—) X direction, and saddle 21 may move in either a (+) Z or a (—) Z direction.

To detect the physical position of the movable members as they are driven to a programmed location, three identical data boxes 72, 73, and 74 are positioned adjacent the top of the vertical member 23, the end of saddle 21, and the end of bed 20, respectively, and are coupled via gear reduction boxes such as 75 to feed screws 33, 66, and 70, respectively. In each data box, the gears are coupled to drive four resolvers as in casings 76 positioned on data box 74, which may be any suitable devices such as selsyns or synchromotors, for example. The gears in each reduction box drive each of the associated resolvers at different speeds to provide a plurality of ranges of resolution. Each resolver has a moving part (not shown) which is mechanically connected to shift in accordance with the position of the associated movable tool member, e.g., the armature of the resolver associated therewith shifts with the movement of saddle 21. As each of the resolver's moving parts shift, they produce an error signal which is proportional to the discrepancy between the programmed location and the physical position of the movable member.

Still referring to FIG. 1, to provide an extremely fine resolution, in addition to the rotary resolvers a linear resolver having a scale 78, and a slider 79, or induction device, sometimes called an "Inductosyn," is mounted between the saddle 21 and table 22, and a similar resolver 78', 79' is mounted between headstock 30 and vertical element 23. Electrically, the linear resolvers or Inductosyns are equivalent to a synchromotor type resolver; however, the magnetic structure is a flat elongated device lying in a single plane instead of being a cylinder or drum. That is, the scale 78 is permanently attached to the table 22 while the slider 79 is permanently attached to the saddle 21 and supported in juxtaposition with the scale. As the table moves, the slider 79 is moved relative to the scale 78 and an error voltage is produced which is indicative of the table's position. There is a similar relation between scale 78' and slider 79' for providing an error voltage relative to the headstock position.

To provide a "zero off-set," each data box 72–74 also includes a servo motor as shown at 80, a tachometer 81, and a differential resolver 82. The differential resolver 82 shifts a signal which energizes a linear resolver scale, such as that shown at 78, for controlling the zero position of the linear resolver. The machine tool members, such as table 22, are physically moved to a reference point and clamped into position by any suitable means (not shown). Thereafter, a servo motor such as 80 drives its associated resolvers under the influence of the tachometer, thereby rotating the stators of the resolvers to a new angular position and establishing a zero or reference position.

To provide numerical control signals for automatically directing the machine tool's movable members, the console 24 has a manual control panel 83, an automatic tape reader 84 and a lamp display panel 85. If the machine is to operate automatically and without any substantial amount of human supervision, data relative to an entire work cycle is punched into a perforated paper tape which may thereafter be inserted in the reader 84 to control the machine tool. On the other hand, if the machine tool is to be operated manually or semi-manually, a workman rotates knobs on control panel 83, thereby providing the numerical control signals which command the machine tool's operations. Alternatively, the perforated tape and manual controls may be operated together. For example, a work cycle may be programmed on perforated tape, and at some point during the cycle, an operator may rotate any of the dials to perform an additional or overriding function.

The numerical data which is read out in console 24 is fed over a cable 86 to the electrical control cabinet 25 which includes any computers or other equipment that may be necessary to convert the read-out signals into the voltages and currents which drive the machine tool. Thereafter, the data is stored in the cabinet 25 until a proper time when signals indicating a programmed position in terms of directions and distances as measured along each axis in which the tool member may move are fed over cable 87 to the automatic machine tool.

Turning next to the mechanical problems of controlling the motion of the machine tool's movable members, reference is made to FIG. 2 which also shows the motor 26 together with an exemplary gear train which may be part of the transmission 27 (FIG. 1). For the purposes of this description only, there are shown four clutch coils 201–204 which may be energized selectively to shift clutches 211–214 and thereby operate a gear train 215 to drive the table 22 at a predetermined feed rate, it being understood that any suitable number of clutches, coils and gears may be provided and further that similar gear trains may be provided to drive along other axes. For example, with the clutches in the position shown, the feed rate is at a speed which is established by the ratio of gears 220–228. If it is assumed for the purposes of this description, that the clutch 213 is operated, the gears 224 and 225 are effectively removed from the gear train 215 and gears 230 and 231 are substituted therefor, thus changing the speed at which feed screw 232 rotates and the rate at which the table 22 is driven. In a similar manner, if any other clutch is shifted by the energization of an associated coil, the feed rate of the table 22 is changed to a different speed. It should be understood that clutch windings 201–204 could just as well operate valves which control a hydraulic system that selects the effective gears in the gear train 215.

To drive the resolvers 237–240, which are part of the data box 73 (FIG. 1), a gear 235 is coupled between the feed screw 232 and gear reduction boxes 236. With the indicated gearing in boxes 236, the resolvers 237–240 provide coarse, coarse-medium, medium, medium-fine, and fine resolutions, respectively, i.e., the coarse resolver 237 makes a single revolution for every one thousand inches of table travel; the coarse-medium resolver 238 makes a single revolution for every one hundred inches of table travel; the medium resolver 239 makes a single revolution for every ten inches of table travel and the medium-fine resolver 240 makes a single revolution for every one inch of table travel. It is to be understood that the gearing in box 236 may be changed to accommodate the needs of any particular tool; therefore, the foregoing relation between the ranges of resolution and tool travel are cited by way of example only. Other similar gear reduction boxes are associated with data boxes 72 and 74 (FIG. 1). The slider and scale which provide the ultimate or fine resolution is shown at 250, 251, each segment (e.g., 252) of the scale 250 being equivalent to a single revolution of a rotary type resolver that is geared to make a revolution for every one-tenth of an inch of table travel.

To provide means for preventing unwanted motion of table 22, a brake winding 241 is provided. To advance the table in a first or (−) direction, a clutch winding 242 is energized, thus driving the feed screw 232 in a first direction. To advance the table 22 in the opposite or (+) direction, another clutch winding 243 is energized, thereby rotating feed screw 232 in an opposite direction.

Hence, it is seen that table 22 may be moved at any of a plurality of feed rates depending upon which of the clutch coils 201–204 is energized at any given time, and that the table may move in either of two directions depending upon which of the clutch coils 242, 243 is energized. Furthermore, since each of the resolvers or error detecting devices is driven at a different rate by gear reduction boxes 236, each resolver provides a different resolution.

To provide a numerical control of the machine tool, an electrical circuit may be provided as shown by the block diagram of FIG. 3, which, although limited to the control of motion in two axes, may be expanded to provide for control of motion in a third axis also. The manner in which FIG. 3 relates to the other figures will become apparent by comparing the reference numerals since the same numerals identify the same parts whenever they occur in the drawings. Although any suitable equipment may be used to complete the circuits that are shown by these hollow boxes, the following enumerated items are devices which have been found to function satisfactorily in an exemplary system. The tape reader 84 may be a device adapted to read the Electronics Industry Association standard format having eight channels, i.e., there is room for eight perforations or holes across the width of the paper tape. The dial-in control panel 83 includes a plurality of rotary switches which may be positioned manually to any numerical indication. The decoder in box 301 includes fast acting relays which selectively operate responsive to digital information transmitted from tape reader 84 or dial-in control 83, as the case may be. As the relays operate, the numerical information is decoded and transmitted through a distributor in box 301 to the X-axis storage 302, to the Y-axis storage 303, or to the slow down and comparison circuit 304, the distributor being operated either responsive to address codes punched into the tape or responsive to the sequence in which data is read-out from the tape.

Each of the storage units 302, 303 includes a digital-to-analog converter composed of numerically operated switching devices having banks which are connected to tapped or auto-transformers. The function of storing a number derived from reader 84 or control 83 is essentially operating the switching device numerically to connect a selected one of a number of taps on an auto-transformer to each of two stator windings on each of the resolvers associated with data boxes 72, 73. In this manner, these windings may be excited by voltages which are ninety electrical degrees apart, one voltage being a function of the sine of a given angle $\theta$ and the other voltage being a function of the cosine of the angle $\theta$, where $\theta$ is the angle of displacement of the resolver's rotor when mechanically driven via reduction gears 236 (FIG. 2) to the programmed location. By using a 10-tap transformer, the 360° through which the resolver armature may turn can be divided into 10 equal parts of 36° each. By cascading a first 10-tap transformer to a second 10-tap transformer, the 360° can be further divided into 100 parts each being equal to 3.6°, and with a third cascaded 10-tap transformer the 360° can be still further divided into 1000 parts each being equal to 0.36°. Referring to the resolution of the resolver 240 (FIG. 2), by way of example, 1.0 inch of linear tool motion equals 360° of rotary resolver motion and the angle $\theta = 83.16°$, for example, equals 0.0231 inch of linear tool motion. Therefore, by means of switching devices in storage units 302, 303 the proper taps on each of three cascaded, tapped transformers may be selected to provide voltages proportional to the sine and cosine function of the angle $\theta$ which corresponds to a desired linear motion of the movable tool member. If the resolver's rotor is at any angle except $\theta$, an error voltage proportional to the angular displacement therefrom is induced in the resolver rotor.

The Inductosyn 78, 79 (FIG. 3) is composed of a slider and scale and may be thought of as a linear equivalent of a resolver having, in the exemplary system, a resolution of 0.1 of an inch of linear motion per 360° of rotary motion, i.e., an electrical null occurs every 0.050″. The slider is the equivalent of a resolver stator and the scale is the equivalent of a resolver rotor. In the illustrated system (FIG. 1), the scale 78 includes a series of 10 inch segments which are joined to cover the entire length of tool travel. When the "Inductosyn" is energized from oscillator 305, an output voltage is induced in scale 78 which is proportional to the frequency of the input voltage, the spacing between the slider and scale, and the distance of the slider from a null point. The particular advantages of the Inductosyn which makes it attractive in this application is the high resolution which it provides for accurate positioning and the absence of backlash between the slider and scales.

An error signal transmitted from each data box and Inductosyn is fed to the proper X-axis and Y-axis control circuits 310, 311 where relays are selectively operated to command the machine tool to operate in the desired manner, the command signals being produced in a relay contact matrix which is represented by hollow box 312.

The remainder of the drawings are directed toward showing and explaining the manner in which the control circuits 310, 311 and the logic matrix 312 operate. Throughout these drawings, certain conventions have been followed which are illustrated generally in FIG. 4. That is, each relay winding is identified as a circle including a reference symbol which identifies the relay. All contacts, both normally opened and normally closed are shown as indicated by appropriate notation in FIG. 4, there being a reference symbol adjacent each contact, the first symbol indicating the operating relay which controls the designated contacts and the following numeral identifying a particular set of contacts on the operating relay. Each time that it is necessary to refer to equipment associated with a particular axis of machine motion, such motion is indicated by a suffix including the reference letters "X" or "Y," as the case may be. Each resolver is shown by an encircled sinusoidal wave which represents the error signal emanating from the resolver, no distinction being made in the electrical circuits between the rotary resolvers and the "Inductosyns." Clutch windings and other solenoids are indicated by an encircled zig-zag line, as shown. Each time that the letters C, CM, M, MF, FA, and FB occur in the drawings, they represent coarse, coarse-medium, medium, medium-fine, fine A, and fine B (or creeping) feed rates. Each time that the letters X and Y occur, they indicate an axis of machine tool motion. Each time that (+) and (−) signs occur, they indicate a direction of machine motion.

A numerical control system is arranged to command the positioning of a workpiece relative to a working tool, there being a plurality of feed rates at which the tool members may be successively driven to cause a slow-down as the programmed location is approached. More particularly, the manner in which the machine tool members are progressively slowed may become more apparent by making reference to FIG. 5 which shows a slow-down pattern for a five speed positioning system. It should be understood that the slow-down pattern that is shown in FIG. 5 is exemplary and that other patterns may be accommodated also. The pattern is plotted on a logarithmic scale with the vertical axis divided to indicate feed rates in percent of the maximum machine traverse speed and the horizontal axis divided to indicate the resolution of the various resolvers, i.e., coarse, coarse-medium, medium, medium-fine, fine A, and fine B or creeping resolutions. In the exemplary system, it was convenient to drive the machine tool at the same feed rate throughout both the coarse and the coarse-medium ranges, and to slow the feed rate in each of the ranges: medium, medium-fine, fine A, and fine B. During positioning only one of the five feedback resolvers is used at a time. As the distance from the programmed location is reduced, the feedback resolvers are switched from one to the other in the order of increasing resolution, the circuits that do the switching being called herein "synchronizing circuits."

When a change in the positions of the tool and work piece is called for, an electrical control system including the synchronizing circuits acknowledges an error signal produced by the rseolver and motion takes place in a manner which moves the tool members to a new position and reduces the error to zero. With reference to FIG. 5, tool travel starts at an arbitrary initial position A and continues at a sustained velocity until the error signal has been reduced to such a magnitude (point B, FIG. 5), that a deceleration of feed rate brings the tool members to rest with zero error at the programmed location, point D. Ideally, as the error reduces, the tool members follow the smooth trajectory that is shown by a dot-dashed line in FIG. 5 as control over the machine is switched successively from the coarse to coarse-medium, to medium, to medium-fine, and to fine, resolvers; however, such a smooth trajectory requires unduly complex controls.

To provide simplified controls without sacrificing performance, the slowdown is made in discrete steps of velocity the last being a creep-speed to final position, all as shown by the solid line curve in FIG. 5. By inspection of FIG. 5 it is seen that when the workpiece is out of position by more than 25 inches, the coarse resolver 237 (FIG. 2) is connected to control the machine, and when the error falls in the range between 25 and 2.5 inches the coarse-medium resolver 238 is connected to supply the error signal. The various clutches 211–214 are arranged to provide a maximum feed rate when controlled from either resolver 237 or 238. When the workpiece reaches a point which is 2.5 inches from the programmed location, the coarse-medium resolver is switched out of the control of the machine tool and the medium resolver 239 is switched to control of the machine tool. Simultaneously therewith, clutches 211–214 are shifted so that the table travels at 41.5 percent of the machines maximum traverse speed. In a similar manner, the remaining medium-fine resolver 240 is switched to control the feed rate and simultaneously therewith clutches 211–214 are shifted to reduce the traverse speed of table 22 as the workpiece approaches the programmed location. Finally, when the table is 0.025 inch from the programmed location, a two range fine resolver 250, 251 is placed in control of the machine to bring the table 22 into position at the programmed location that is indicated by the data readout in console 24 (FIG. 1). Therefore, it is seen that the resolution of the various resolvers are associated with the machine tool's feed rates, i.e., the machine tool members travel fastest when controlled by the coarse and coarse-medium resolver, slowest when controlled by the fine resolver in a second or fine-B range, and otherwise at similarly related feed rates.

In accordance with this invention, the machine tool is adapted to move a workpiece directly to a programmed location relative to a working tool in a motion which is a composite of the motion that is commanded along the two axes—a motion that is sometimes called "time sharing" herein. The plot of such a time sharing or composite motion is shown in FIG. 6 which is a curve (transferred to a logarithmic scale) which might be drawn on a paper attached to the face of workpiece 65 (FIG. 1) by a pencil attached to working tool 31 as the machine tool members are driven to the programmed location. The vertical axis of FIG. 6 is divided to indicate the resolution of the various resolvers associated with a first or Y-axis motion and the horizontal axis of FIG. 6 is divided to indicate the resolution of resolvers associated with a second or X-axis of motion. It is assumed by the showing of "Sample Trajectory #1" (FIG. 6) that when the command signals are received by the machine tool, the work support is at the point A, i.e., when control signals are received the tool members are less than 25 inches out of position along the Y-axis and almost 10 inches out of position along the X-axis.

To drive both the X-axis feed screw 66 (FIG. 1) and the Y-axis feed screw 33 at a high rate of speed throughout the coarse-medium range of resolution, clutches associated with transmission 27 (similar to those shown in FIG. 2) are selectively operated responsive to signals emanating from the coarse-medium resolvers positioned along the X- and Y-axes. Responsive thereto, the work support moves from point A (FIG. 6) toward the programmed location at an angle of 45° relative to X- and Y-axes. When the point B (FIG. 6) is reached, the coarse-medium resolver in the X-axis is switched out of control of the machine tool and the medium resolver is switched to control the machine tool; however, since the machine tool members have not yet reached the medium range in the Y-axis, the feed in the X-axis is held in neutral while the feed in the Y-axis continues to drive at a high rate of speed. Thereafter, the tool members move in a straight line along the Y-axis as indicated by the curve extending from point B to point D in FIG. 6. At point D, the tool members have moved out of the coarse-member range in both the X- and Y-axes; thereafter, both of the feed screws 33, 66 are driven and the tool members move in a 45° angle directly to the programmed position shown at E in FIG. 6. The "Sample Trajectory #2" (FIG. 6) shows how the machine operates if the moving members are at a different starting point when the command signals are received. In a similar manner, any number of different trajectories could be shown depending upon the starting point from which the tool members are driven. It should be understood, however, that the graph of FIG. 6 is somewhat idealized since the inertia of the various moving parts, circuit responsive time, etc., may prevent the sharp, angular switching points that are shown in the drawing.

Before turning to the electrical circuitry that is provided to accomplish the slow-down and time sharing control functions depicted by the graphs of FIGS. 5 and 6, reference is made to a target table (FIG. 7) which is exemplary of the manner in which the clutches and gear ratios of transmission 27 may be arranged.

In the target table of FIG. 7, the total traverse speed (120 inches per minute) has been divided into thirty-two convenient feed rates which are identified in the last column in terms of inches per minute of tool travel. Having determined the feed rates which are most appropriate for a particular machine, the ratio of gears in transmission 27 is selected and clutch windings (H1–H7) are provided to shift the gears, as required. The "x's" in columns H1–H7 of FIG. 7, identify those clutch windings which are energized in the exemplary system, to shift the gears in a proper manner to drive the machine at the indicated feed rates. Obviously, as many different target tables may be prepared as may be necessary to accommodate the machine tool requirements.

*First Embodiment*

Figure 9:
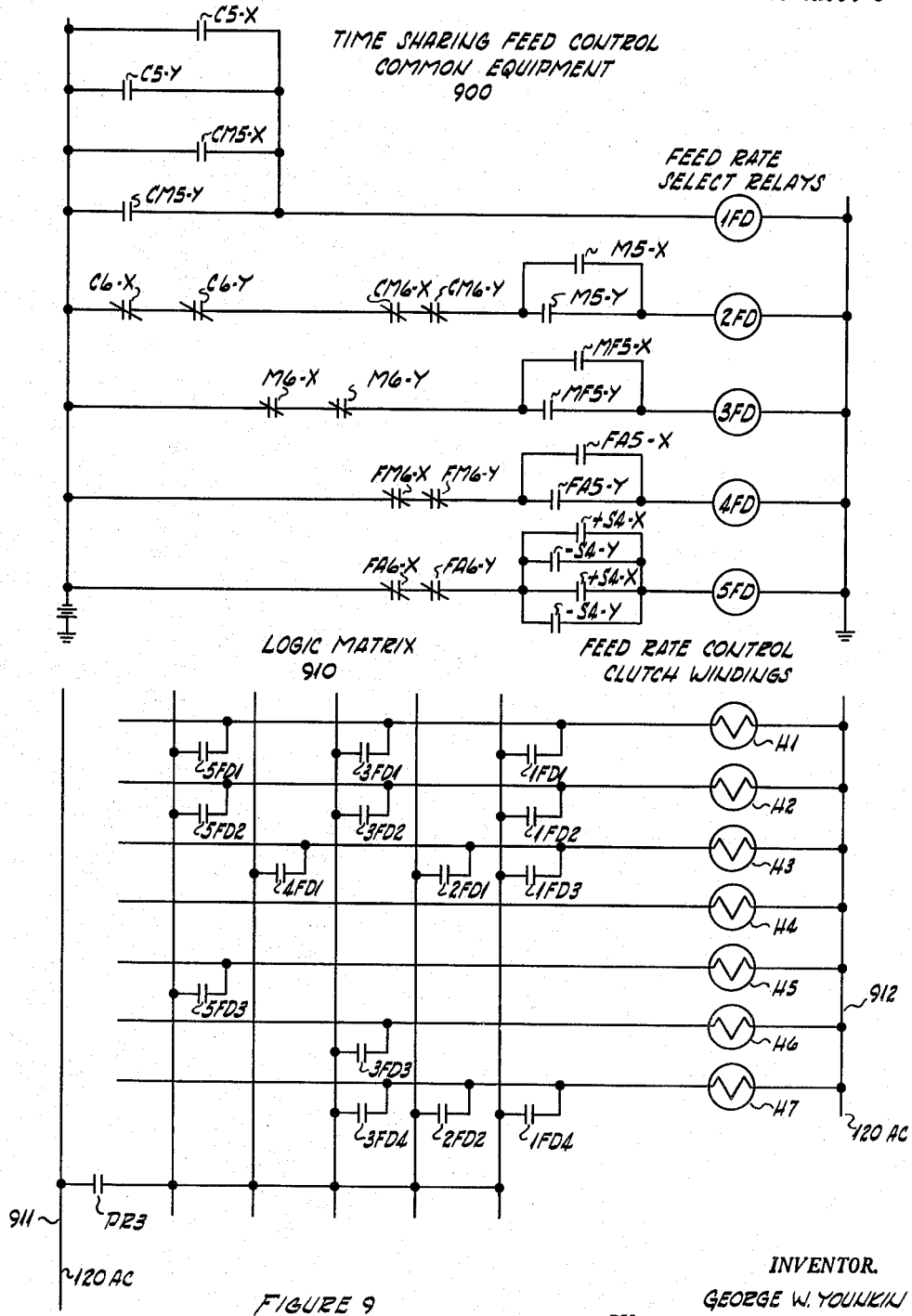
Figure 10:
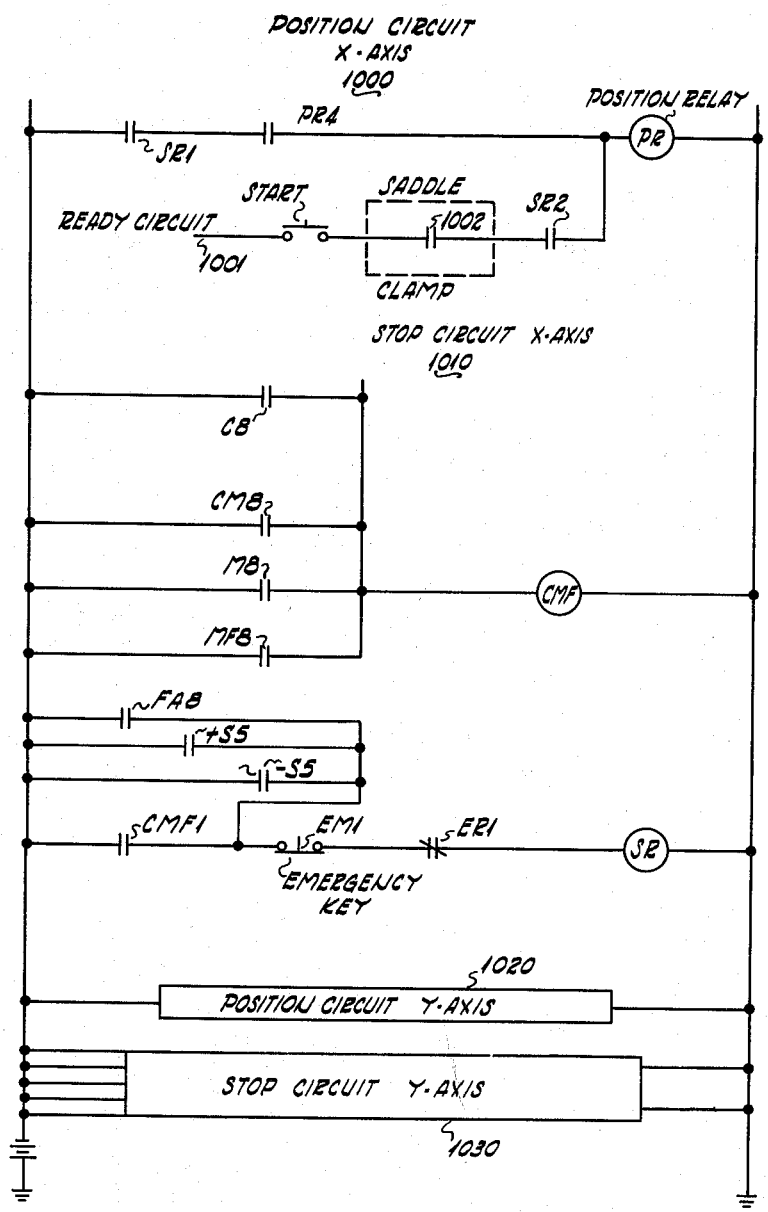

The purpose of the electrical control system, one embodiment of which is shown in FIGS. 8–10, is to energize the clutch windings selectively under the control of the resolvers to provide a slow-down, time sharing feed rate as shown by the graphs of FIGS. 5 and 6. For example, in the coarse and coarse-medium ranges, the machine tool members are driven under the influence of resolvers 237, 238 (FIG. 2) at one hundred twenty inches per minute if clutch windings H1, H2, H3 and H7 are energized, at eighty-five inches per minute if clutch windings H1, H3 and H7 are energized, etc., all as shown in the target table of FIG. 7. After the resolvers switch to the medium range, the tool members may be driven at fifty inches per minute of clutch windings H3 and H7 are energized, at thirty-five inches per minute if clutch windings H1, H2, H4 and H7 are energized, etc., again as shown in FIG. 7. In a similar manner, any of the thirty-two feed rates may be selected.

Turning next to FIG. 8, there is shown the four resolvers 237–240 of the X-axis data box 73 (FIG. 1) and a rotary resolver 250 in lieu of linear resolvers with scale and slider elements 78, 79. Each resolver provides an output signal having an amplitude which varies sinusoidally as a function of the error between the programmed location and the physical position of the machine tool members as measured along the X-axis. Since the resolvers are geared in a 10–1 ratio, each resolver has an output signal which is ten times the frequency of a resolver having the next coarser resolution. For example, if resolver 237 is assumed to have the output signal depicted by curve A in FIG. 8, then resolver 238 will have the output signal depicted by curve B. In a similar manner, if the output signal of resolver 238 is assumed to be curve A, the the output signal of resolver 239 is as shown by curve B.

The output signal of each resolver is applied to an individually associated amplitude switch 801–805 and the output signals from resolvers 237–240 are applied to a common discriminator circuit 810. Each amplitude switch is adapted to conduct only when the output signal received from the associated resolver exceeds a predetermined limit. For example, if curve A (FIG. 8) represents the output of coarse resolver 237, coarse amplitude switch 801 conducts during the period marked e and coarse-medium amplitude switch 802 conducts during each of the periods marked f. Hence, amplitude switch 802 is rendered conductive and non-conductive ten times during a complete cycle of 360° in the output of resolver 237. There is a similar relation between the coarse-medium amplitude switch 802 and the medium amplitude switch 803, etc. Each time that an amplitude switch conducts, an associated relay C, CM, M, MF, and FA is energized.

To make each of the resolvers individually effective, in its turn, for controlling the automatic machine tool members via discriminator 810, a matrix of relay contacts C1, C2, CM1, CM2, etc., is provided. Thus, in the coarse range, relay C operates to close contacts C1 while opening contacts C2 to associate resolver 237 with and disassociate resolvers 238–240 from discriminator 810. As the same time contacts C4 open to prevent any of the relays CM, M, MF, FA, +S or −S from operating. In the coarse-medium range, contacts CM1 close and contacts CM2 open to associate resolver 238 with while disassociating resolvers 239–240 from discriminator 810. There is no need for relay CM to disconnect resolver 237 since switch 801 is turned off by the reduced amplitude of the coarse error signal, thus releasing relay C and opening contacts C1. Also contacts C4 open to prevent relays M, MF, FA, +S and −S from operating. Assumming that coarse amplitude switch 801 conducts over the range e (FIG. 8) and that coarse medium amplitude switch 802 conducts over each of the ranges f, it is apparent upon inspection of curves A and B that there is an overlap so that relay C does not release until relay CM has had time to operate. Since it is the release of relay C which controls the change in feed rate, there is no time when the machine control is not positively commanded to travel at a fixed feed rate.

The discriminator 810 is any suitable device, such as a rectifier bridge, for example, which provides an output signal having a polarity which corresponds to the polarity of the input signal. Thus, if the machine tool movable member is on one side of the programmed location, the resolver 237 is in the positive going area of the curve A and an output signal having positive potential appears at the (+) terminal of the discriminator 810. One the other hand, if the machine tool movable member is on an opposite side of the programmed location, resolver 237 is in the negative going area of the curve A and an output signal appears at the (−) terminal of the discriminator 810. The capacitors 812 and 813 provide a low resistance path for shunting A.C. noise to ground and the potentiometers 814 and 815 control the amplitude of a signal which is required to fire the associated thyratrons. Normally, these potentiometers are adjusted so that the associated thyratrons fire at the 25% point in the resolvers output, thereby operating the associated thyratrons over the ranges "g" and "h". The 25% point is selected to permit full use of the maximum range of voltage change in the resolver's output.

To control the direction in which machine tool members move, there is connected to each output terminal of discriminator 810, an individually associated thyratron coupled to control a direction relay +D, −D. Thus, the direction relay +D operates if the machine tool movable member is commanded to move in a (+) direction along the X-axis and the direction relay −D operates if the machine tool movable member is commanded to move in an opposite or (−) direction along the X-axis.

In operation, the machine tool movable members are an unknown distance from the programmed location at the time when the numerical program data is read-out to control the machine tool operation. The resolver of coarsest resolution which is then producing an error signal having an amplitude sufficient to trip the associated amplitude switch is connected to discriminator 810. To illustrate, if the machine tool members are in the coarse range, the error signal from resolver 237 operates switch 801 and relay C which closes contacts C1 while opening contacts C2. Therefore, only resolver 237 may be effective for controlling the direction relays +D, −D via discriminator 810. Thereafter, coarse resolver 237 is disconnected from discriminator 810 at contacts C1, and coarse-medium resolver 238 is substituted therefor at contacts CM1 and C2. In a similar manner, the control of discriminator 810 is progressively switched from the control of coarser resolvers to finer resolvers as the machine tool members are driven closer to the programmed location.

To control the creep speed and to stop the machine tool at the programmed location, fine resolver 350 is connected to discriminator 810 via contacts FA1, both of which apply a proper signal to either (+) or (−) terminals in accordance with the polarity of an error signal. Between the 25% and 38% points in the output of resolver 250, switch 805 operates relay FA and contacts FA1 close to energize discriminator 810, thus holding a direction relay operated. After reaching the 38% point in the output of resolver 250, relay FA drops out and the direction relay releases. Responsive to the output of discriminator 820, either thyratron 821 or thyratron 822 fires and one of the stop relays +S or −S operates to close contacts and energize clutch windings 242, 243 (which are also shown in FIG. 2) for driving the machine tool members. When the error signal from resolver 250 virtually disappears, discriminator 820 removes its output signal, the stop relay releases and contacts controlled thereby open to disengage the drive of the machine tool by releasing the clutches associated with both of the direction clutch windings 242 and 243.

Simultaneously with the above described operation of the synchronizing circuit 800 associated with the X-axis, a similar synchronizing circuit 830 is functioning along the Y-axis. Although it is not shown, it should be understood that still another synchronizing circuit may be provided to control motion in the Z-axis as required.

To drive the movable members along the X-axis, one of the clutch windings 242 or 243 is energized in accordance with which of the direction relays +D, −D or stop relays +S, −S is operated. Assuming that the machine tool is moving in a (+) direction, either contacts +D1 or +S1 are operated and a circuit is completed through the (+) direction clutch winding 243 to operate transmission 27 (FIG. 2) and feed screw 232 whereby table 22 is driven in a (+) direction. The contacts −D2 and −S2 provide an interlock which prevents both of the direction clutch windings 242, 243 from being energized simultaneously. The contacts PR1 and PR2 provide an interlock with a start circuit so that the machine tool members can not be driven when the tool is in an "off" condition.

To provide a trajectory as shown in FIG. 6, the direction clutch windings are selectively energized by direction circuits individually associated with each axis of machine tool motion. The X-axis direction circuit is shown in detail at 840 and the Y-axis direction circuit is shown by a hollow block 850, it being understood that both direction circuits are the same, and that a Z-axis direction circuit may also be provided. If the movable members are at other than the programmed location, one of the X-axis resolvers 237—240, 250, and similar resolvers along the Y-axis, produce an output signal; therefore one of the synchronizing circuit relays C, CM, M, MF, FA, +S or −S is operated to close one of the contacts C3–X, CM3–X, M3–X, MF3–X, FA3–X, or +S3–X, −S3–X. The contacts C3–Y, CM3–Y, M3–Y, MF3–Y, and FA3–Y, are controlled by relays in the Y-axis synchronizing circuit 830 which correspond to similiarly designated relays in the X-axis circuit 800. Therefore, there is an interlock whereby the direction circuits associated with one axis cannot be effective if the machine tool members are in a coarser range in the other axis. Thus, it is seen that the logic of the relay contacts in direction circuits 840, 850 produce the machine tool travel depicted by FIG. 6. That is, along "Sample Trajectory #1," between points A, B, contacts C3–X are closed while corresponding contacts are closed in the Y-axis direction circuit 850 and the machine members are driven in both the X- and Y-axes simultaneously. Between the points B, D (FIG. 6), the machine members are driven out of the coarse-medium range of resolution in the X-axis but not in the Y-axis; therefore, medium relay M–X operates to close contacts M3–X but the relay C–Y has not yet released, contact C3–Y remain open, and X-axis clutches 242, 243 cannot be energized. Therefore, between the points B and D (FIG. 6), the machine tool members are driven along the Y-axis only. At point D, the machine tool members enter the medium resolution range in the Y-axis; therefore, relay C–Y in circuit 830 releases, contacts C3–Y close, and both the X- and Y-direction feed screws are connected to be driven by motor 26 when the clutch windings are energized in direction circuits 840, 850.

To drive the machine tool members in the slow-down pattern of FIG. 5 and at feed rates determined by the target table of FIG. 7, the time sharing feed control circuit 900 (FIG. 9) is provided with five feed rate selected relays 1FD–5FD. If the machine tool members are in the coarse range of the X-axis movement, coarse relay C in the X-axis synchronizing circuit 800 is operated and contacts C5–X are closed to operate feed select relay 1FD. If the machine tool members are in a correspondingly coarse range of resolution along the Y-axis movement, contacts C5–Y are closed in a similar manner, also to operate feed selected relay 1FD. In a similar manner contacts CM5–X and CM5–Y are controlled by relay CM (FIG. 8). Contacts C5–X, C5–Y may or may not be closed simultaneously depending upon the position of the machine tool members, e.g., between points A, B (FIG. 6) both contacts are closed and between points B, D only contacts C5–Y are closed. When relay 1FD operates, it closes its contacts 1FD1–1FD4 in logic matrix 910, thereby energizing feed rate control clutch windings H1, H2, H3, and H7. By way of example, the circuit through winding H1 may be traced from a first A.C. bus 911 through contacts PR3, 1FD1 and the winding H1 to a second A.C. bus 912. Responsive to the energization of these four windings, transmission 27 is operated in a manner which will be apparent from the foregoing description of FIG. 2 to drive the machine tool members at a high feed rate. Upon inspection of the target table of FIG. 7, it is seen that the feed rate is one-hundred-twenty inches per minute when windings H1, H2, H3 and H7 are energized.

As the machine tool members pass out of the coarse-medium range of motion in the X-axis (i.e., point B, FIG. 6), both of the direction clutch windings 242, 243 are de-energized to shift the transmission 27 into neutral along that axis, as explained above. Since the machine tool is not yet out of the coarse-medium range in the Y-axis, relay CM–Y remains operated, contacts CM6–Y are open to prevent operation of feed rate relay 2FD, contacts CM5–Y remain closed, relay 1FD remains operated, contacts 1FD1–1FD4 remain closed, clutch windings H1, H2, H3 and H7 remain energized, and the tool members continue to move at one-hundred-twenty inches per minute, but in the Y-direction only.

When the tool members pass-out of the coarse-medium range in the Y-direction (i.e., point D, FIG. 6), both of the coarse-medium relays CM–X and CM–Y release to close contacts CM6–X and CM6–Y. Both of the medium relays M–X and M–Y pick-up to close contacts M5–X and M5–Y. A circuit is now completed from battery through contacts C6–X, C6–Y, CM6–X, CM6–Y, M5–X, M5–Y and the winding of a second feed rate relay 2FD (which operates) to ground. Responsive thereto, contacts 2FD1 and 2FD2 close to energize feed rate control clutch windings H3 and H7. Hence, according to the target table of FIG. 7, the rate at which the machine tool members are driven is shifted from one hundred twenty inches per minute to fifty inches per minute. It is thought that the manner in which the remaining feed rate control relays 3FD–5FD operate to shift transmission 27 will be obvious from the foregoing.

Upon comparison of the target table of FIG. 7 and the logic matrix 910, it is seen that any number of feed rates may be accommodated by the expedient of changing the wiring in matrix 910. For example, to change the coarse feed rate from one hundred twenty to eighty-five inches per minute, contacts 1FD2 are removed; or to change the coarse feed rate from one hundred twenty to sixty-five inches per minute, contacts 1FD1 are removed. In a similar manner, any other contacts in matrix 910 may be changed to accommodate the feed rates that are shown in FIG. 7. Moreover, it should be understood that the particular arrangement of the logic matrix 910 is given by way of example only. If a different target table is prepared the configuration of the logic matrix may be changed.

Start-Stop Interlock

To prevent operation of the machine at improper times, circuits are provided along each axis of movement to interlock start and stop functions. To explain this matter more fully, reference is made to FIG. 10 which shows the details of an X-axis start or position circuit 1000, and an X-axis stop circuit 1010, there being similar circuits along the Y-axis as indicated by hollow boxes 1020 and 1030, respectively. It should be understood, of course, that still other similar circuits may be associated with the Z-axis also.

To initiate operation of the machine tool, a "Start" switch is operated to interconnect a "Ready Circuit" and a "Saddle Clamp." The ready circuit may include any suitable device (e.g., a main power switch, a timer, a counter, etc.) which applies a battery marking to conductor 1001 when the machine is ready to operate. The saddle clamp includes a set of contacts 1002 which are closed by the machine tool if its members may be moved and are opened if its members may not be moved, thereby providing an interlock between the mechanical and electrical systems. A typical operation of this interlock is illustrated by an automatic drilling machine where contacts 1002 open to prevent the severe damage which would result from moving the workpiece while a hole is being drilled. Contacts SR2 are still another interlock which prevents operation of relay PR except when the machine tool is actually being driven through its work cycle. Once the circuit including contacts 1002 and SR2 is closed by operation of the "Start" key relay PR picks up and locks to the battery bus over the circuit including its own contacts PR4 and contacts SR1. Hence, it is seen that contacts on relay PR may be utilized to provide an interlock between the electrical and the mechanical circuits.

Referring next to the stop circuit 1010 for the X-axis, relay CMF (coarse-to-medium-fine) operates via one or more of the contacts C8, CM8, M8, or MF8 any time that an error signal is produced by a coarse, coarse-medium, medium, or medium-fine resolver 237–240. Contacts (not shown) on the relay CMF may provide any suitable control signaling by indicating when the machine tool members are more than a predetermined distance from a programmed position, as when a zero position is being initially selected, for example. In addition, relay CMF closes contacts CMF1 and energizes stop relay SR over a circuit extending from the battery bus through contacts CMF1, EM1, ER1 and the winding of stop relay SR to the ground bus. When the control over the machine tool shifts from the coarse-to-medium-fine range to the fine range, stop relay SR is controlled at contacts FA8, +S5 or −S5, as the case may be. When relay SR operates, contacts SR1 and SR2 close points in the operate and lock circuits of the position relay PR. The emergency key contacts EM1 provide a manual control for causing a so-called "Red Button Stop" and the contacts ER1 provide for an automatic stop control. When either of these contacts (EM1 or ER1) open, the stop relay SR falls to open contacts SR1 and SR2. Responsive thereto, relay PR restores to open its many contacts, thereby releasing all circuits controlled thereby.

Slow Down and Comparison Circuit

Figure 11:
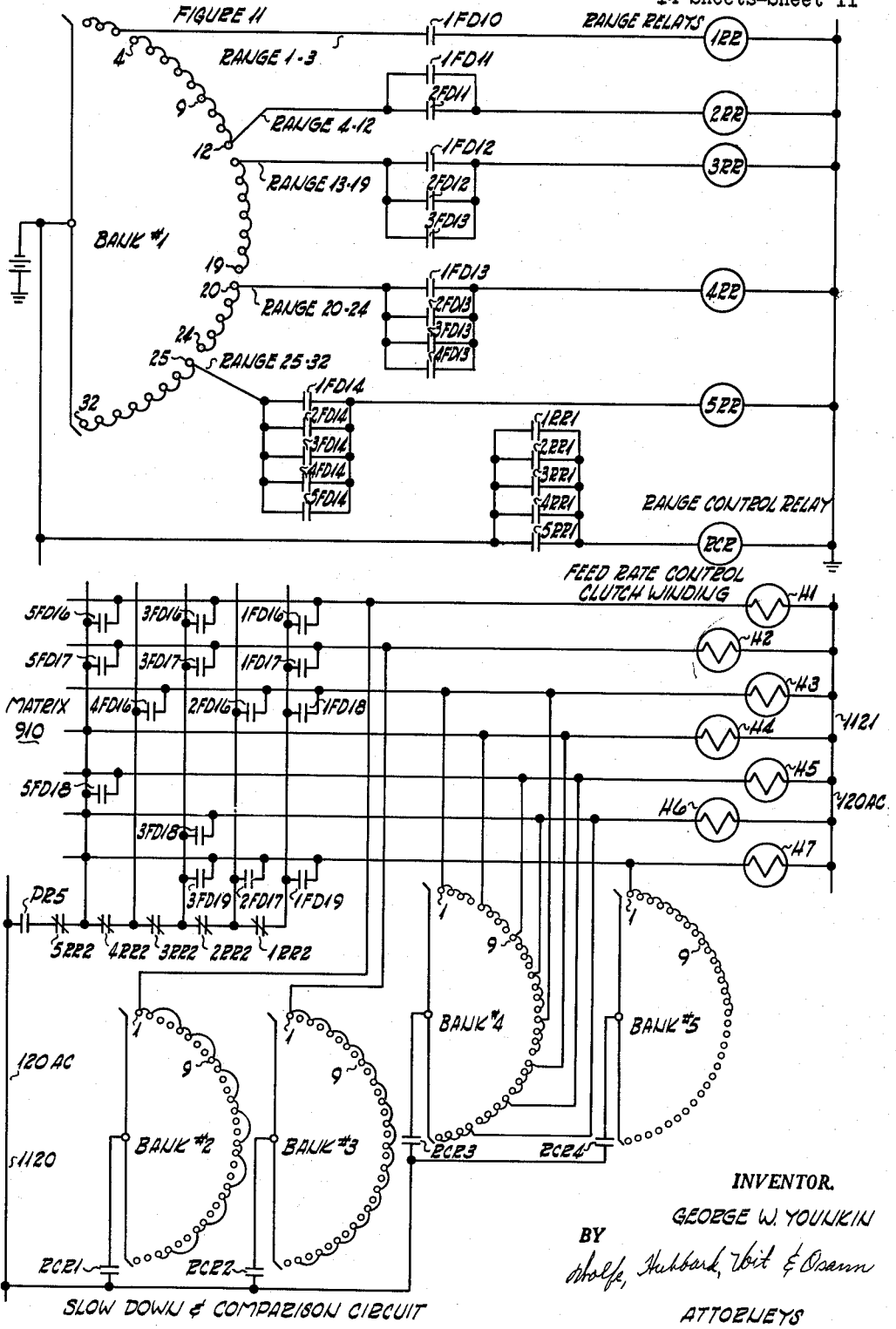
FIG. 11 is a circuit diagram showing a slowdown and comparison circuit which prevents the machine tool from exceeding a maximum allowable cutting rate.

Turning next to FIG. 11, there is shown a slow down and comparison circuit which is used to prevent the machine tool from being driven at a feed rate which exceeds the maximum allowable cutting speed. More specifically, in a mode of positioning which does not involve cutting while the workpiece is moving, the feed rate is determined solely by the distance of the workpiece from the programmed location. However, with cutting during movement, it may be unwise or even disastrous to drive the machine members at feed rates in excess of the maximum allowable rate. On the other hand, it is still desirable where possible to drive the machine tool members through the slow down pattern of FIG. 5 to reduce the total machine tool travel time.

In construction, the slow down and comparison circuit of FIG. 11 includes as major components a rotary or stepping switch having five sets or banks of contacts, and a logic matrix which in this case is the same as matrix 910 (FIG. 9). The rotary switch is numerically operated by data which is either read-out by tape reader 84 or derived from the dial-in control 83 and utilized to operate magnet M, all as shown in FIG. 3. When magnet M operates, the wipers associated with the five banks are driven simultaneously to a selected set of terminals which are wired to indicate a maximum allowable feed rate. It should be understood that any suitable number of terminals per bank may be provided and that the banks may be strapped in any desirable manner; however, for convenience of description, the banks are shown in FIG. 11 as having 32 terminals which are strapped in accordance with the various feed rates which are set forth in the target table, FIG. 7. That is, the terminals 1–3 in bank 1 correspond to the feed rates which are designated "coarse" and "coarse-medium" in FIG. 7. In a similar manner, the terminals 4–12 correspond to "medium," the terminals 13–19 to "medium-fine," the terminals 20–24 to "fine-A," and the terminals 25–32 to "fine-B." The thirty-two terminals in banks 2–5 of FIG. 11 are wired to energize clutch windings H1–H7 in accordance with the data in the target table of FIG. 7. Thus, the clutch winding H1 is energized on steps 1, 2, 5, 6, etc., of bank 2, the clutch H2 is energized on steps 1, 3, 5, 7, etc., of bank 3, and each of the remaining clutches is energized in a similar manner. Hence, it is seen that the rotary switch may be driven to select any one of the thirty-two target table feed rates responsive to the receipt of numerical command signals.

In operation, each of the five feed rate select relays 1FD–5FD is energized in the manner explained above in connection with the description of FIG. 9. As each feed rate relay is energized, it closes contacts for controlling the range relays 1RR–5RR (FIG. 11). Thus, if the indicated feed rate is in the coarse range of resolution, relay 1FD closes its contacts 1FD10–1FD14 to prepare a circuit for each of the range relays 1RR–5RR. If it is assumed for the purposes of this description that the maximum allowable feed rate is ten inches per minute, each of the wipers engages the ninth associated terminal in accordance with the information that is set forth in the target table (FIG. 7), i.e., the ninth feed rate is ten inches per minute. Therefore, range relay 2RR operates over a circuit including contacts 1FD11. When range relay 2RR operates, contacts 2RR1 close to operate range control relay RCR over an obvious circuit. Responsive thereto, contacts RCR1–RCR4 close to complete a circuit between the A.C. busses 1120 and 1121 via banks 2–5 and the clutch windings H1–H7. Contacts 2RR2 open to disable contacts 1FD16–1FD19 and contacts 2FD16–2FD17.

With the circuit in the described condition, contacts 1FD16–1FD19 have no effect when feed relay 1FD (FIG. 9) operates during the coarse range of resolution. In lieu thereof, range control relay contacts RCR1–RCR4 connect the wipers of banks 2–5 (FIG. 11) to energize clutch windings H1, H2, H5, and H7, the assumption being that each of the wipers is standing on its ninth terminal. Therefore, according to the target table (FIG. 7), the machine drives its members at a feed rate of ten inches per minute despite the fact that operation of relay 1FD commands a feed rate of one hundred twenty inches per minute.

As the automatic machine tool members approach the programmed location, the resolvers switch from the coarse range through the coarse-medium range to the medium range of resolution. Therefore, a circuit is completed for operating feed rate select relay 2FD (FIG. 9), as explained above. Comparing the target table with the 2FD relay contacts in matrix 910, it is seen that the machine members are now commanded to move in the coarse-medium range at a speed rate of fifty inches per minute; however, the maximum allowable cutting speed is not fifty inches per minute but is ten inches per minute. Therefore, when contacts 2FD11 close, a circuit is completed through terminal 9 of bank 1 for again operating range relay 2RR. Responsive thereto, contacts 2RR1 close again to operate range control relay RCR. Contacts 2RR2 open again, this time to disable contacts 2FD16 and 2FD17. Hence, the feed rate select relay 2FD can exercise no control through the logic matrix 910 and the aforementioned circuit through the ninth terminal in each of the banks 2–5 is effective for maintaining the uniform feed rate of ten inches per minute.

When the resolvers switch from the medium to the medium-fine range, feed rate select relay 3FD operates. Upon inspection of the wiring on bank 1 in FIG. 11, it is seen that there are no contacts controlled by relay 3FD for operating range relay 2RR when the wipers are standing on the ninth terminals. Since none of the range relays operate at this time, all of the range relay contacts 1RR2–5RR2 are closed; therefore, a circuit is completed from the A.C. bus 1120 through position relay contacts PR5 and the range relay contacts to matrix 910. Since contacts RCR1–RCR4 are now open, the markings in banks 2–5 can have no effect. Therefore, contacts 3FD16–3FD19 control the machine and its moving members are slowed to the feed rate of 3.3 inches per minute since the clutch windings H1, H2, H6 and H7 are now energized, a typical circuit being traced from A.C. bus 1120 through contacts PR5, 5RR2, 4RR2, 3RR2, 3FD16, and the clutch winding H1 to A.C. bus 1121.

When the fine resolver switches to the fine-A drive, contacts FA6-X and FA6-Y close to operate relay 5FD after relay MF falls, thus exercising a normal control over the machine tool through the logic matrix 910. When relay FA falls, the control is switched to the stop relays "S"; whereupon feed relay 5FD exercises its normal control through matrix 910. Hence, it is seen that the slow down and comparison circuit of FIG. 11 compares the indicated feed rate with the maximum allowable feed rate and automatically selects the slower of the two.

*Second Embodiment*

Figure 12:
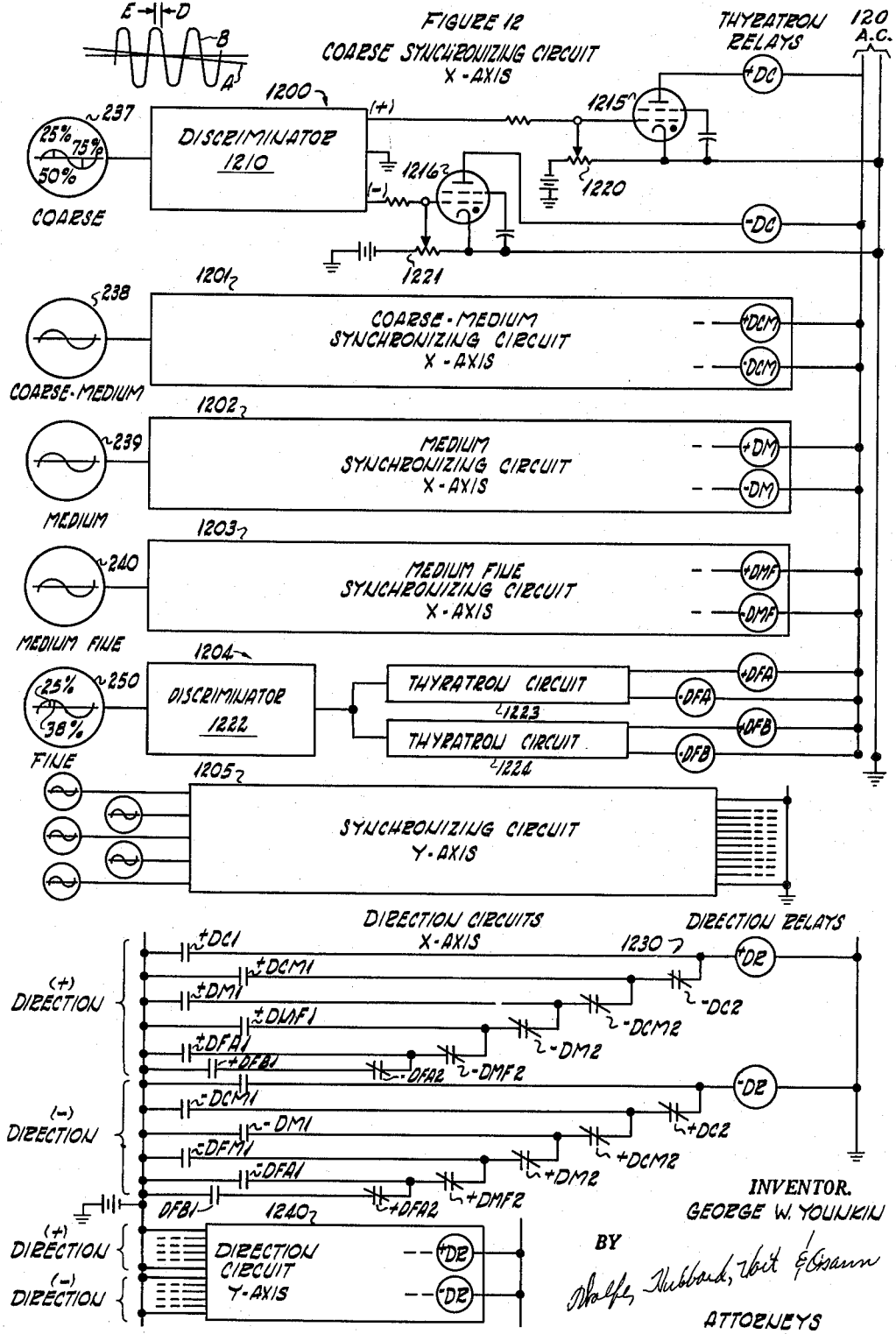
Figure 14:
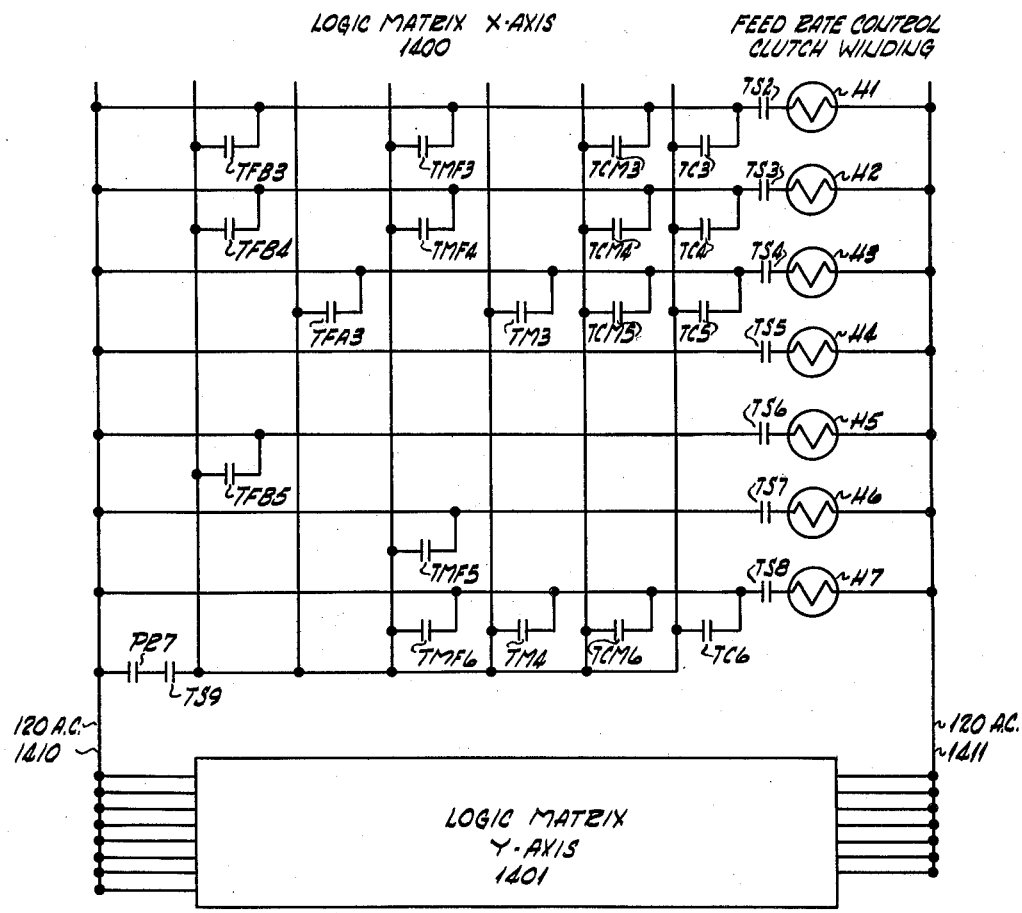

A second embodiment of the invention is shown by the circuits of FIGS. 12–14. The primary difference between this embodiment and the above described first embodiment (FIGS. 8–10) lies in the manner in which the resolvers are interconnected to control the machine tool. The slow down and comparison circuit of FIG. 11 may be used equally well with both embodiments.

In this second embodiment of the invention, each of the X-axis resolvers 237–240 and 250 has an individually associated synchronizing circuit, one X-axis synchronizing circuit being shown in detail at 1200 and the remaining X-axis synchronizing circuit being shown by hollow boxes 1201–1204. Five similar synchronizing circuits associated with the Y-axis are provided as indicated at 1205.

The major components in each of the synchronizing circuits includes a discriminator 1210 which is connected to apply an output signal to either its (+) or (−) terminal in accordance with the output signal emanating from the individually associated resolver 237. The thyratrons 1215, 1216 are connected to the (+) and (−) output terminals, respectively, of discriminator 1210. In the plate circuit of the thyratrons there are connected the relays +DC and −DC, respectively, which control the direction of machine tool movement. The input circuits to the thyratrons includes a potentiometer 1220, 1221 which may be adjusted to determine the switching point at which the thyratron is turned off and on. Ideally, the thyratron 1215 is biased to fire at the point which is designated 25% and thyratron 1216 is biased to fire at the point which is designated 75%, thereby making maximum use of the available range in the output of resolver 237.

The output signal of each resolver is related to the output signal of an adjacent resolver as shown by curves A and B in FIG. 12. For example, if curve A represents the output of coarse resolver 237, curve B represents the output of coarse-medium resolver 238. Similar curves are shown in FIG. 8. Referring to the curves A, B, the potentiometer 1220 may be adjusted to cause thyratron 1215 to cut-off when the output from discriminator 1210 falls to the point D (FIG. 12). A similar potentiometer in the coarse-medium synchronizing circuit 1201 may be adjusted to cause a thyratron to fire at the point E. Hence, by an inspection of the curves shown in FIG. 12, it is seen that there is an overlap whereby a synchronizing circuit having coarser resolution remains energized until after a synchronizing circuit having finer resolution takes over the control of the machine tool. Each of the other synchronizing circuits 1202–1203 has a similarly arranged switching point.

To provide a creep speed feed rate and to stop machine motion, the fine resolver 250 is connected to a discriminator 1222 having its output connected to two thyratron circuits 1223 and 1224, each of which is similar to the circuit including thyratrons 1215, 1216. However, to follow the pattern of FIG. 5, the potentiometer like 1220 which is associated with circuit 1223 is adjusted to cause the associated relay +DFA to assume control over the machine when relay +DMF falls and the movable members are .025 inch from the programmed position. The potentiometer associated with circuit 1224 is adjusted to cause relay +DFB to take over control of the machine tool when relay +DFA falls and the movable members are .003 inch from the programmed location and to stop the machine by releasing when it reaches the programmed location. For example, the relay +DFA may operate at the 25% point in the output of fine resolver 250, and relay +DFB may operate at the 38% point. Obviously the points 25% and 38% are selected by way of example only. The relays −DFA and −DFB operate in a similar manner when the output of resolver 250 is negative going.

A particularly interesting feature to note at this time is that it is not necessary to provide an individual resolver for each and every feed rate; rather, one resolver may control two or more feed rates merely by adjusting the switching points of the associated thyratron relays.

Assuming that the movable members of the automatic machine tool are out of position by an amount which falls in the coarse resolution range along the X-axis, an output signal is fed from resolver 237 to discriminator 1210, the output signal having a polarity and an amplitude which is indicative of the distance that the automatic machine tool member is from the programmed location. If, for example, a corrective motion in the coarse range and the (+) direction along the X-axis is required, thyratron 1215 fires and the coarse direction relay +DC operates; or, if a corrective motion is required in the (−) direction and in the medium range, relay −DM operates. In a similar manner, any other of the thyratron relays may be operated in accordance with the output of the resolvers. Simultaneously therewith, synchronizing circuits 1205 along the Y-axis are effective for commanding the movement of the automatic machine tool members in a Y-direction.

Turning next to the operation of the X-axis direction circuit shown at 1230, there are two relay contact matrices—one for the (+) direction and one for the (−)

direction. Duplicate circuits are provided for the Y-axis, as shown at 1240 and similar circuits may be provided for the Z-axis, if required. If any of the thyratron controlled (+) relays (e.g., +DC, +DCM, etc.) is operated, contacts, such as +DC1 for example, close to operate a corresponding direction relay +DR. Conversely, if any of the (—) direction thyratron relays operate contacts such as —DC1 close to operate the direction relay —DR. To provide an interlock between the (+) and (—) direction matrices, contacts such as —DC2 are arranged to open the circuit to the (+) direction relay +DR while the synchronizing circuit 1200 is commanding operation in the (—) direction. Similar contacts in the (—) direction matrix such as +DC2, for example, provide an interlock for preventing operation of the (—) direction relay —DR while the thyratron relays are commanding tool motion in the (+) direction.

To select the proper feed rate, contacts on the (+) or (—) thyratron relays (e.g., +DC, —DC, +DCM, —DCM, etc.) close to operate a feed rate select relay which is shown in the feed rate control circuit 1300 (FIG. 13). For example, referring to FIG. 12, in the (+) direction of the coarse range along the X-axis, an error signal emanating from resolver 237 operates thyratron relay +DC to cause a closure of contacts +DC3 (FIG. 13) to operate a coarse range feed rate select relay TC, thereby causing the machine tool members to move at a coarse feed rate. When the resolution is switched to the coarse-medium range, an error signal from resolver 238 operates relay +DCM, contacts +DCM3 close to operate the feed rate select relay TCM and the machine tool members are driven at a coarse-medium feed rate. All of this operation causes effects similar to those described above in connection with the operation of feed rate relays 1FD–5FD. The contacts such as TC1 provide an interlock so that no resolver having a finer resolution may be effective at a time when a resolver having a coarser resolution is effective. Hence, it is seen that the sequential operation of relays TC–TFB produce the slow down pattern that is shown in the graph of FIG. 5.

Simultaneously with the described feed rate selection along the X-axis, corresponding relays in the Y-axis synchronizing circuit 1205 operate relays in the Y-axis feed rate control circuit 1301 and similar relays may operate along the Z-axis, if provided.

To provide for the simultaneous motion in two axes as indicated by the graph of FIG. 6, a time sharing feed control circuit 1302 is provided to direct the motion of the machine tool members as they move simultaneously in both the X- and Y-directions. More specifically, if the machine tool members are more than 25 inches from the programmed location along the X-axis, contacts TC2–X close and time sharing relay TS operates. As the machine tool members move from the coarse resolution range to the coarse-medium resolution range, contacts TC2–X open and TCM2–X close. If the machine tool members are now in the coarse resolution range in the Y-axis, contacts TC2–Y are open and relay TS releases. When the tool members thereafter reach the coarse-medium resolution range in the Y-axis, contacts TC2–Y close and time sharing relay TS again picks up. Hence, it is seen that time sharing relay TS is operated only when the moving members are in a resolution range along the X-axis which is as coarse as or coarser than the resolution range along the Y-axis.

A similar Y-axis time sharing feed control circuit 1304 is provided to control a time share relay in accordance wtih the positioning of the tool members relative to distances measured along the Y-axis. A time sharing circuit may also be provided along the Z-axis, as required.

To drive the machine tool members along the X-axis, a circuit 1305 is arranged to energize (+) and (—) direction clutch windings. If the time sharing relay TS of the X-axis control circuit 1302 is operated, contacts TS1 are closed and a circuit may be completed for energizing one of the direction clutch windings depending upon whether direction relay +DR or —DR is operated in circuit 1230. On the other hand, if the TS relay in the X-axis circuit 1302 is released, contacts TS1 open and neither of the clutch windings may be energized. Therefore, the machine is in neutral with respect to the X-axis drive. A similar circuit is provided at 1306 to drive the tool members along the Y-axis, and similar Z-axis control may also be provided, if required. Hence, if the machine tool members are in a medium resolution range in the X-axis and a coarse-medium resolution range in the Y-axis (between points B, D, FIG. 6) contacts TCM2–Y (FIG. 13) are open while contacts TM2–X are closed, relay TS is released, contacts TS1 are open and the X-axis drive is in neutral while the Y-axis drive is being operated at a high feed rate so that the machine tool members follow the trajectory shown in FIG. 6.

To actually energize the clutch windings which drive the machine tool members, a logic matrix, 1400, 1401 is individually associated with both the X-axis and the Y-axis clutch windings. Basically, the logic matrix of FIG. 14 is substantially the same as the logic matrix of FIG. 9; therefore, it is thought that the manner in which the clutch windings H1–H7 are energized will be apparent from the above description of matrix 910. Specifically, if the machine tool members are in the coarse range of the X-axis movement, coarse relay TC (FIG. 13) operates and contacts TC3–TC6 are closed to energize feed rate control windings H1, H2, H3 and H7. By way of example, the circuit through clutch winding H1 may be traced from a first 120 volt A.C. bus 1410 through contacts PR7, TS9, TC3, TS2 and the winding of clutch H1 to a second A.C. bus 1411. The contacts TS2–TS8 provide an interlock to prevent energization of clutch windings if the time sharing relay TS is not energized.

Responsive to the energization of windings H1, H2, H3, and H7, transmission 27 is shifted to operate at the feed rate of one hundred twenty inches per minute, as shown by the target table of FIG. 7. If, by way of example, it is desirable to reduce this feed rate to eighty-five inches per minute, contacts TC4 are deleted and if it is desirable to reduce the feed rate to sixty-five inches per minute, contacts TC3 are removed, all as shown on the target table of FIG. 7.

It is though that the manner in which the remaining contacts in the logic matrix 1400 may be connected together with the manner in which the slow down and comparison circuit of FIG. 11 may be integrated with the logic matrix 1400, will be obvious from the foregoing description. Another similar matrix, 1401, is provided for the Y-axis and still another matrix may be provided for the Z-axis, if required.

I claim as my invention:

1. In an automatic machine for moving a working tool in either direction along one axis and for moving a material support in either direction along a second axis, the combination comprising means for commanding said tool and said material support to move to a programmed location, said commands being in the form of signals indicating distances measured along each of said axes, means disposed along each of said axes for detecting the differences between the physical locations of said tool and said support and the programmed location, means responsive to the detection of a substantial variation between the differences along each of said axes for driving said machine along only one of said axes until there is substantially the same difference along each of said axes, and means responsive to the detection of substantially the same difference along each of said axes for driving said machine along both of said axes simultaneously.

2. In an automatic machine having a tool and a work support adjustably positionable relative to each other in either direction along at least two axes, the combination comprising numerical data control means for programming a work cycle of said automatic machine including the positioning of said tool relative to said work support, means for reading out data from said last named means relative to the movement of parts of said machine along each of said two axes, means for comparing said read out data with the physical location of said machine parts, means responsive to said comparing means for causing said machine parts to move along both of said two axes at a first feed rate, means responsive to said machine parts reaching successive points at reducing distances from the position indicated by said read out data for commanding said machine parts to move at successively slower feed rates, means responsive to said last named means commanding said machine parts to move at different feed rates along said two axes for stopping the motion of said machine parts along one axis and for moving said machine parts along the other axis until said last named means commands said machine parts to move at the same feed rate along both of said axes, and means responsive to said machine parts reaching substantially the position indicated by said read-out data for causing said machine parts to stop.

3. In an automatic machine having a plurality of movable members for selectively positioning a material support relative to a working tool, the combination comprising signal transmitting means for causing said members to move to a programmed location, said signals defining said programmed location as different distances and directions along either of at least two axes, means responsive to said signal transmitting means for moving said members to said programmed location in a non-linear motion made up of straight line segments which is a composite of the distances and directions indicated by said signals, means for progressively slowing said motion at successive slow down points as said members approach said programmed location, and means for halting said motion along one of said axes responsive to the machine members reaching a slow down point along said one of said axes before the same slow down point is reached along the other of said axes and for continuing the motion along the other of said axes until said members reach the same slow down point equidistant along both of said axes from said programmed location.

4. In an automatic machine having a plurality of movable members, the combination comprising means controlled by numerical data designating a programmed location as distances and directions measured along either of at least two axes for moving said members simultaneously along both of said axes toward said programmed location, means for progressively slowing the motion of said members at successive slow down points as said programmed location is approached, and means responsive to the slowing of one of said members at a slow down point along one of said axes before a corresponding slowing of another of said members at the same slow down point along the other of said axes for halting motion along said one axis and for continuing motion along the other of said axes until the slow down point is reached.

5. In an automatic machine having a plurality of movable members, the combination comprising means controlled by numerical data for causing said members to move to a programmed location, said data defining said programmed location as distances along at least two axes, means responsive to said last named means for driving said members simultaneously along both of said axes toward said programmed location, means for incrementally slowing the motion of said members as a function of the distance of said members from said programmed location, and means responsive to said members being incrementally slowed by different amounts along said two axes for driving said members along one axis only.

6. In a control system for positioning a first member relative to a second member responsive to programmed numerical control signals, the combination comprising means for driving said members to a commanded position at any of a plurality of feed rates, a plurality of error detecting elements of progressively coarser resolution for comparing the physical location of said members with the location of said commanded position and for transmitting error signals as the members progress through the resolution ranges of the elements having an amplitude which varies in accordance with the difference between said physical location and said commanded position, each of said error detecting elements having a resolution which corresponds to an associated one of said feed rates, said association being such that said error detecting elements of progressively coarser resolution are associated with feed rates of progressively higher speeds, means comprising a plurality of thyratron controlled relays coupled to be energized responsive to said error signals having greater than a predetermined amplitude, and means responsive to successive detections of error signals having less than said predetermined amplitude by error detecting elements of progressively finer resolution for successively controlling said relays to switch from higher feed rates and coarser resolution detecting elements to lower feed rates and finer resolution detecting elements.

7. In an automatic machine having a tool member and a work support member mounted for movement relative to each other in at least two directions, the combination comprising means including a perforated tape for programming operation of said automatic machine including the positioning of said work support member relative to said tool member, means for reading out and storing at least some of the data punched into said perforated tape relative to said movement in each of said two directions, means for simultaneously rendering effective said stored data relative to both of said two directions for causing simultaneous movement of said members in both of said two directions, means responsive to the movement of a member to a location in one of said two directions substantially exceeding the location of a member in the other of said two directions for driving said members in only said other direction until said members reach a point having substantially the same location in both of said directions, and means for thereafter driving said members simultaneously in both of said directions.

8. In a system for numerically controlling two movable machine tool members, each of which is independently movable along an associated axis whereby said two members are movable in two axes relative to each other, the combination comprising means responsive to numerical control signals for commanding movement of said member to a programmed location relative to each other, means for driving said members to said programmed location at any of a plurality of feed rates, a plurality of error detecting means each having a different resolution disposed along each of said axes for comparing the physical location of the member which is movable along such axis with said programmed location, each of said detecting means having a resolution which corresponds to an associated one of said feed rates, said association being such that said detecting means of progressively coarser resolution are associated with progressively higher ones of said feed rate, means responsive to successive detections of minimum errors for simultaneously switching from higher feed rates and coarser resolution detecting means to lower feed rates and finer resolution detecting means, means responsive to a simultaneous detection of errors in each of said axes by detecting means having the same resolution for driving both of said members simultaneously, and means responsive to a simultaneous detection of errors in each of said axes by detecting means having different resolutions for driving only the one of said members which is then in the coarser range of resolution.

9. In an automatic machine having a tool member and a work support member mounted for movement along at least two axes, the combination comprising means including a perforated tape for controlling a work cycle of said machine including a programmed positioning of said members along each of said two axes, means for reading out and storing data punched into said tape relative to the positioning of said members along each of said two axes, means responsive to said last named means for indicating a maximum allowable feed rate at which said members can move relative to each other, means responsive to said stored data for commanding the simultaneous movement of said members along said two axes at a preselected feed rate, means for selecting the slower of said maximum allowable feed rate and said preselected feed rate, and means responsive to said members reaching successive points at reducing distances from the programmed position for commanding said members to move at successively slower feed rates, and means responsive to said members reaching substantially the programmed position for causing said members to stop.

10. In a numerical control system for positioning a first member relative to a second member, the combination comprising means including said first member for feeding a workpiece to a tool in said second member, a maximum feed rate being determined by the nature of the workpiece and the tool, means responsive to numerical control signals for commanding movement of said first member to a programmed location relative to said second member, means for driving said first member to said programmed location at any of a plurality of feed rates, a plurality of error detecting means for comparing the physical location of said first member with said programmed location, each of said error detecting means having a resolution which corresponds to an associated one of said feed rates, said association being such that the error detecting means of progressively coarser resolutions are associated with progressively higher ones of said feed rates, means responsive to successive detection of reducing error signals for normally switching from higher feed rates and coarser resolutions to lower feed rates and finer resolutions, and means for comparing the normal feed rate with the maximum feed rate and for selecting the slower of the two.

11. In a system for positioning the movable members of an automatically controlled machine tool responsive to the receipt of programmed numerical control signals, the combination comprising means for driving said members to a commanded position at any of a plurality of feed rates, a plurality of error detecting means for comparing the physical location of said members with the location of said commanded position and for transmitting error signals, each error signal having an amplitude which varies in accordance with the difference between said physical location and said commanded position, first of said error detecting means having a resolution which corresponds to an individually associated one of said feed rates, other of said error detecting means having a resolution which corresponds to a plurality of said feed rates, said association being such that said error detecting means of progressively coarser resolution are associated with feed rates of progressively higher speeds, means associated with each of said first error detecting means comprising a plurality of electronically controlled relays coupled to be energized responsive to said error signals having greater than a predetermined amplitude, and means associated with each of said other error detecting means comprising a plurality of electronically controlled relays coupled to be energized selectively according to the amplitude of the error detecting means associated therewith, whereby some of said error detecting means control said machine when operating at a single feed rate and other of said error detecting means control said machine when operating over a range of feed rates.

12. In a numerical control system for positioning a first member relative to a second member, the combination comprising means including said first member for feeding a workpiece to a tool in said second member, a maximum feed rate being determined by the nature of the workpiece and the tool, means responsive to numerical control signals for commanding movement of said first member to a programmed location relative to said second member, means for driving said first member to said programmed location at any of a plurality of feed rates, a plurality of error detecting means for comparing the physical location of said first member with said programmed location, first of said error detecting means having a resolution which corresponds to an individually associated one of said feed rates, other of said error detecting means having a resolution which corresponds to a plurality of said feed rates, said association being such that the error detecting means of progressively coarser resolutions are associated with progressively higher ones of said feed rates, whereby some of said error detecting means control the feeding of said workpiece to said tool at a single feed rate and other of said error detecting means control the feeding of said workpiece to said tool at a plurality of feed rates, means responsive to successive detection of reducing error signals for normally switching from higher feed rates and coarser resolutions to lower feed rates and finer resolutions, and means for comparing the normal feed rate with the maximum feed rate and for selecting the slower of the two.

13. In a system for numerically controlling two movable machine tool members, each of which is independently movable along an associated axis whereby said two members are movable in two axes relative to each other, the combination comprising means responsive to numerical control signals for commanding movement of said members to a programmed location relative to each other, means for driving said members to said programmed location at any of a plurality of feed rates, a plurality of error detecting means each having a different resolution disposed along each of said axes for comparing the physical location of the member which is movable along such axis with said programmed location, first of said detecting means having a resolution which corresponds to an individually associated one of said feed rates, other of said error detecting means having a resolution which corresponds to a plurality of said feed rates, said association being such that said detecting means of progressively coarser resolution are associated with progressively higher ones of said feed rate, whereby each of said first error detecting means controls said movable member when moving at a single feed rate and each of said other error detecting means controls said movable members when moving at a plurality of said feed rates, means responsive to successive detections of minimum errors for simultaneously switching from higher feed rates and coarser resolution of said first detecting means to lower feed rates and finer resolution detecting means, and means responsive to detection of successive switching points in the output of said other error detecting means for switching from higher to lower feed rates, means responsive to a simultaneous detection of errors in each of said axes by detecting means having the same resolution for driving both of said members simultaneously, and means responsive to a simultaneous detection of errors in each of said axes by detecting means having different resolutions for driving only the one of said members which is then in the coarser range of resolution.

14. In an automatic machine having a material support and separate drive means for moving said support in either direction along either of two axes, the combination comprising, error detecting elements of progressively finer resolution associated with each axis for comparing the physical location of said support along the respective axis with the end point and for transmitting error signals as the support progresses through the resolution ranges of the elements in moving toward an end point which are a function of the distance to said end point, said elements being progressively satisfied to produce a null error signal, means including a record for operating one of said drive means to move said support along one axis toward a programmed end point, means responsive in the course of such support movement along said one axis to a null error signal from an error detecting element associated with said one axis for operating both said drive means to provide movement along both axes, and means responsive in the course of such support movement along both axes to a null error signal from another error detecting element for continuing the operation of one of said drive means and for halting the operation of the other of said drive means so that said support continues to move along only one axis.

15. In an automatic machine having movable members and separate drive means for moving said members relative to each other in either direction along either of two axes, the combination comprising, error detecting elements of progressively finer resolution associated with each axis for comparing the physical location of said members along the respective axis with the end point and for transmitting error signals as the members progress through the resolution ranges of the elements which are a function of the remaining distance thereto, said elements being progressively satisfied to produce a null error signal, means for operating one of said drive means to move said members relatively along one axis toward a programmed end point, means responsive to a null error signal from an error detecting element associated with said one axis for operating both said drive means to move said members simultaneously along both axes, and means responsive to a null error signal from an error detecting element of finer resolution than said first named element for continuing the operation of one of said drive means and for halting the operation of the other of said drive means so that said members continue to move relatively along only one axis.

16. In an automatic machine having movable members and separate drive means for moving said members relative to each other in either direction along either of two axes, means including a record for automatically moving said support to a programmed end point from a starting point located a different distance therefrom in each axis, comprising, in combination, error detecting elements of progressively finer resolution associated with each axis for comparing the physical location of said members along the respective axis with the end point and for transmitting error signals as the members progress through the resolution ranges of the elements in moving toward said end point which are a function of the remaining distance thereto, said elements being progressively satisfied to produce a null error signal, means responsive to a simultaneous detection of error signals by error detecting elements having different resolutions in each of said axes for operating only one of said drive means to move the support toward the end point along the one axis on which the support is then in the coarser range of resolution, and means responsive in the course of such movement along said one axis to a null error signal from an error detecting element associated with said one axis for operating both said drive means to provide movement along both axes toward said end point.

17. In an automatic machine maving movable members and separate drive means for moving said members relative to each other in either direction along either of two axes, means including a record for automatically moving said support to a programmed end point from a starting point located a different distance therefrom in each axis, comprising, in combination, error detecting elements of progressively finer resolution associated with each axis for comparing the physical location of said members along the respective axis with the end point and for transmitting error signals as the members progress through the resolution ranges of the elements in moving toward said end point which are a function of the remaining distance thereto, said elements being progressively satisfied to produce a null error signal, means responsive to a simultaneous detection of error signals by error detecting elements having different resolutions in each of said axes for operating only one of said drive means to move the support toward the end point along the one axis on which the support is then in the coarser range of resolution, means responsive in the course of such support movement along said one axis to a null error signal from an error detecting element associated with said one axis for operating both said drive means to provide movement along both axes toward said end point, means responsive in the course of such movement along both axes to a null error signal from an error detecting element associated with the other of said two axes for continuing the operation of said one drive means and for halting the operation of the other drive means to move said members along only said one axis until said members are the same distance along both axes from said end point, and means responsive to a null error signal from detecting elements of equal resolution in each of said axes for operating both said drive means to move said members simultaneously along both axes toward said end point.

18. In an automatic machine having movable members and separate drive means for moving said members relative to each other in either direction along either of two axes, means including a record for automatically moving said support to a programmed end point from a starting point located a different distance therefrom in each axis, comprising, in combination, error detecting elements of progressively finer resolution associated with each axis for comparing the physical location of said members along the respective axis with the end point and for transmitting error signals as the members progress through the resolution ranges of the elements in moving toward said end point which are a function of the remaining distance thereto, said elements being progressively satisfied to produce a null error signal, means responsive to a simultaneous detection of error signals by error detecting elements having different resolutions in each of said axes for operating only one of said drive means to move the support toward the end point along the one axis on which the support is then in the coarser range of resolution until said members are the same distance along both axes from said programmed end point, and means responsive to a null error signal from error detecting elements of equal resolution in each of said axes for operating both said drive means to move said members simultaneously along both axes toward said end point.

19. In an automatic machine having movable members and separate drive means for moving said members relative to each other in either direction along either of two axes, the combination comprising, error detecting elements of progressively finer resolution associated with each axis for comparing the physical location of said members along the respective axis with an end point and for transmitting error signals as the members progress through the resolution ranges of the elements toward said end point which are a function of the remaining distance thereto, said elements being progressively satisfied to produce a null error signal, means including a record for operating one of said drive means to move said members along one axis toward a programmed end point until said members are the same distance along both axes from said programmed end point, and means responsive to a null error signal from error detecting elements of equal resolution in each of said axes for operating both said drive means to move said members simultaneously along both axes toward said programmed end point.

References Cited in the file of this patent
UNITED STATES PATENTS 2,784,359 Kamm _____ Mar. 5, 1957
2,833,941 Rosenberg et al. _____ May 6, 1958